United States Patent
Gabbai

(10) Patent No.: US 12,332,665 B1
(45) Date of Patent: Jun. 17, 2025

(54) PUBLIC TRANSPORT INFRASTRUCTURE FACILITATED DRONE DELIVERY

(71) Applicant: eBay Inc., San Jose, CA (US)

(72) Inventor: Jonathan Gabbai, London (GB)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/731,137

(22) Filed: May 31, 2024

Related U.S. Application Data

(63) Continuation of application No. 18/318,943, filed on May 17, 2023, now Pat. No. 12,045,770, which is a continuation of application No. 17/096,468, filed on Nov. 12, 2020, now Pat. No. 11,783,283, which is a continuation of application No. 14/794,698, filed on Jul. 8, 2015, now Pat. No. 10,867,277.

(51) Int. Cl.
| | |
|---|---|
| G05D 1/661 | (2024.01) |
| G05D 1/667 | (2024.01) |
| G05D 105/28 | (2024.01) |
| G05D 107/00 | (2024.01) |
| G05D 109/25 | (2024.01) |
| G06Q 10/0835 | (2023.01) |

(52) U.S. Cl.
CPC ............ *G05D 1/663* (2024.01); *G05D 1/667* (2024.01); *G06Q 10/08355* (2013.01); *G05D 2105/285* (2024.01); *G05D 2107/95* (2024.01); *G05D 2109/254* (2024.01)

(58) Field of Classification Search
CPC ......... G06Q 10/0836; G06Q 10/08355; B64C 39/024; B64C 2201/128; G08G 5/0034; G08G 5/0069
See application file for complete search history.

(56) References Cited

U.S. PATENT DOCUMENTS

| | | |
|---|---|---|
| 8,498,947 B1 | 7/2013 | Haake et al. |
| 8,825,226 B1 | 9/2014 | Worley |
| 8,989,053 B1 | 3/2015 | Skaaksrud et al. |
| 8,989,922 B2 | 3/2015 | Jones et al. |
| 9,454,157 B1 | 9/2016 | Hafeez et al. |
| 9,527,587 B2 | 12/2016 | Levien et al. |
| 9,536,216 B1 | 1/2017 | Lisso |

(Continued)

OTHER PUBLICATIONS

Holger Pfaender, An Object Oriented Approach for Conceptual Design Exploration of UAV-Based System-of-Systems, 2003, p. 1-3 (Year: 2003).*

(Continued)

*Primary Examiner* — Ibrahim N El-Bathy
(74) *Attorney, Agent, or Firm* — FIG. 1 Patents

(57) ABSTRACT

Systems and methods for public transport infrastructure facilitated drone delivery are provided. In example embodiments, a request to deliver a package to a drop-off destination using a drone is received. Public infrastructure information is accessed. A public infrastructure terminal from which the drone delivers the package is identified based on the public infrastructure information. An instruction is communicated to transport the package to the identified public. A drone delivery route from the identified public infrastructure terminal to the drop-off destination is determined based on the public infrastructure information. An instruction to deliver the package using the drone delivery route is communicated to the drone.

20 Claims, 20 Drawing Sheets

(56) References Cited

U.S. PATENT DOCUMENTS

| | | | |
|---|---|---|---|
| 9,828,092 | B1 | 11/2017 | Navot et al. |
| 9,944,404 | B1 | 4/2018 | Gentry |
| 10,867,277 | B2 | 12/2020 | Gabbai |
| 11,783,283 | B2 | 10/2023 | Gabbai |
| 12,045,770 | B2 | 7/2024 | Gabbai |
| 2005/0060164 | A1 | 3/2005 | Eli Berl Illion |
| 2014/0032034 | A1* | 1/2014 | Raptopoulos .......... G05D 1/227 |
| | | | 701/25 |
| 2014/0222248 | A1 | 8/2014 | Levien et al. |
| 2014/0254896 | A1 | 9/2014 | Zhou et al. |
| 2015/0154431 | A1 | 6/2015 | Skaaksrud et al. |
| 2015/0227882 | A1* | 8/2015 | Bhatt ................... G06Q 10/083 |
| | | | 705/330 |
| 2015/0370251 | A1 | 12/2015 | Siegel et al. |
| 2016/0027261 | A1* | 1/2016 | Motoyama ............. G06Q 10/04 |
| | | | 340/313 |
| 2016/0068264 | A1* | 3/2016 | Ganesh .............. G06Q 30/0641 |
| | | | 701/4 |
| 2016/0107750 | A1 | 4/2016 | Yates |
| 2016/0185466 | A1 | 6/2016 | Dreano |
| 2016/0196756 | A1 | 7/2016 | Prakash et al. |
| 2016/0200438 | A1 | 7/2016 | Bokeno et al. |
| 2016/0257401 | A1 | 9/2016 | Buchmueller et al. |
| 2016/0364823 | A1* | 12/2016 | Cao ........................ G06Q 50/40 |
| 2017/0011340 | A1 | 1/2017 | Gabbai |
| 2021/0065108 | A1 | 3/2021 | Gabbai |
| 2023/0289714 | A1 | 9/2023 | Gabbai |

OTHER PUBLICATIONS

"Final Office Action", U.S. Appl. No. 14/794,698, Aug. 7, 2020, 30 pages.
"Final Office Action", U.S. Appl. No. 14/794,698, May 2, 2019, 47 pages.
"Final Office Action", U.S. Appl. No. 14/794,698, Jul. 27, 2018, 53 pages.
"Non-Final Office Action", U.S. Appl. No. 14/794,698, Feb. 19, 2020, 43 pages.
"Non-Final Office Action", U.S. Appl. No. 14/794,698, Jan. 30, 2018, 44 pages.
"Non-Final Office Action", U.S. Appl. No. 14/794,698, Dec. 19, 2018, 56 pages.
U.S. Appl. No. 14/794,698, , "Advisory Action Received for U.S. Appl. No. 14/794,698, mailed on Sep. 9, 2020", Sep. 9, 2020, 3 Pages.
U.S. Appl. No. 14/794,698, , "Applicant Initiated Interview Summary Received For U.S. Appl. No. 14/794,698, mailed on Jul. 3, 2019", Jul. 3, 2019, 3 Pages.
U.S. Appl. No. 14/794,698, , "Applicant Initiated Interview Summary Received For U.S. Appl. No. 14/794,698, mailed on Jul. 15, 2019", Jul. 15, 2019, 3 Pages.
U.S. Appl. No. 14/794,698, , "Applicant Initiated Interview Summary received for U.S. Appl. No. 14/794,698, mailed on Feb. 21, 2019", Feb. 21, 2019, 3 Pages.
U.S. Appl. No. 14/794,698, , "Applicant Initiated Interview Summary Received for U.S. Appl. No. 14/794,698, mailed on Mar. 30, 2020", Mar. 30, 2020, 3 Pages.
U.S. Appl. No. 14/794,698, , "Applicant Initiated Interview Summary Received for U.S. Appl. No. 14/794,698, mailed on Sep. 8, 2020", Sep. 8, 2020, 3 Pages.
U.S. Appl. No. 14/794,698, , "Applicant-Initiated Interview Summary received for U.S. Appl. No. 14/794,698, mailed on Aug. 14, 2018", Aug. 14, 2018, 6 Pages.
U.S. Appl. No. 14/794,698, , "Notice Of Allowance received for U.S. Appl. No. 14/794,698, mailed on Oct. 15, 2020", Oct. 15, 2020, 10 Pages.
U.S. Appl. No. 17/096,468, "Final Office Action", U.S. Appl. No. 17/096,468, Dec. 14, 2022, 13 pages.
U.S. Appl. No. 17/096,468, , "Non-Final Office Action", U.S. Appl. No. 17/096,468, Feb. 16, 2023, 12 pages.
U.S. Appl. No. 17/096,468, , "Non-Final Office Action", U.S. Appl. No. 17/096,468, Jun. 9, 2022, 33 pages.
U.S. Appl. No. 17/096,468, , "Notice of Allowance", U.S. Appl. No. 17/096,468, Apr. 11, 2023, 13 pages.
U.S. Appl. No. 18/318,943, , "Non-Final Office Action", U.S. Appl. No. 18/318,943, Dec. 11, 2023, 18 pages.
U.S. Appl. No. 18/318,943, , "Notice of Allowance", U.S. Appl. No. 18/318,943, Mar. 27, 2024, 9 pages.
Pfaender, Holger et al., "An Object Oriented Approach for Conceptual Design Exploration of UAV-Based System-of-Systems", 2nd AIAA "Unmanned Unlimited" Conf. and Workshop & Exhibit [retrieved Apr. 11, 2023]. Retrieved from the Internet <https://doi.org/10.2514/6.2003-6521>, Jun. 26, 2012, 11 pages.
Pfaender, Holger et al., "An Object Oriented Approach for Conceptual Design Exploration of UAV-Based System-of-Systems", Aerospace Research Central, Session: UU-7: Network Centric Systems and Operations, Jun. 26, 2012, 11 pages.
Robineet, Tom , "HorseFLy 'Octocopter Primed to Fly the Future to Your Front Door", Retrieved from the internet: http://www.uc.edu/news/nr.aspx?id=19929, Jun. 4, 2014, 5 pages.
Tom, , "HorseFly 'Octocopter' Primed to Fly the Future to Your Front Door", [Online]. Retrieved from the Internet: <URL: http://www.uc.edu/news/nr.aspx?id=19929>, Jun. 4, 2014, 5 pages.
Vahed, Hossein , "Coupling of Drones with Public Buses", Retrieved from the Internet: https://www.dronesforgood.ae/award/finalists/couplingdronespublicbuses—on Jun. 11, 2015, 1 page.

\* cited by examiner

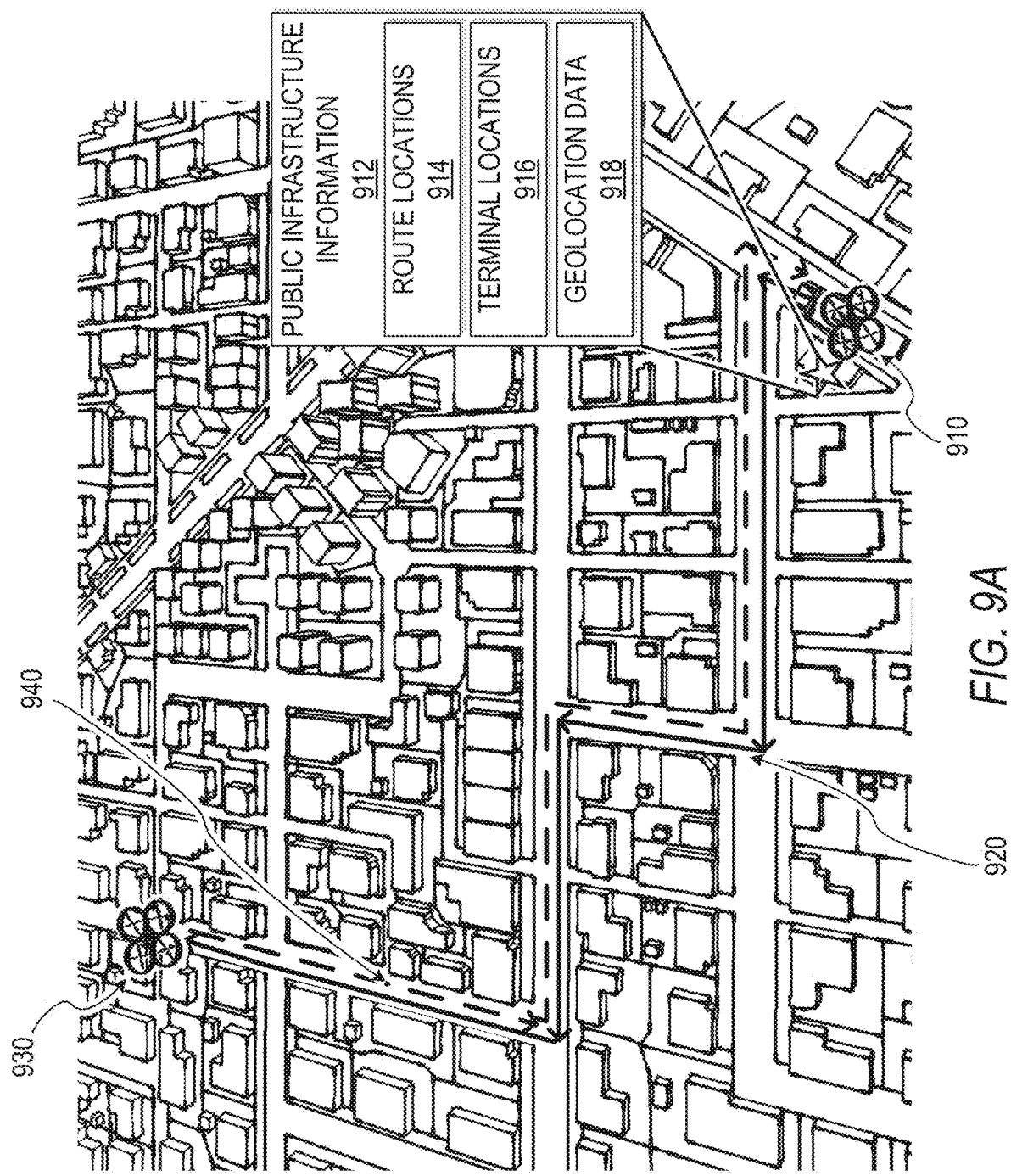

PUBLIC TRANSPORT INFRASTRUCTURE FACILITATED DRONE DELIVERY

RELATED APPLICATIONS

This application is a continuation of and claims priority to U.S. patent application Ser. No. 18/318,943, filed May 17, 2023, which is a continuation of and claims priority to U.S. patent application Ser. No. 17/096,468, filed Nov. 12, 2020, which is a continuation of and claims priority to U.S. patent application Ser. No. 14/794,698, filed Jul. 8, 2015, which is incorporated by reference herein in its entirety.

TECHNICAL FIELD

Embodiments of the present disclosure relate generally to delivery methods and, more particularly, but not by way of limitation, to public transport infrastructure facilitated drone delivery.

BACKGROUND

Although numerous sectors have become more automated through the use of technology, the process of doorstep delivery has not changed much. In areas which are not densely populated, such as areas on the borders of large metropolitan areas, traditional doorstep delivery may be time-consuming and costly. Moreover, in densely populated areas, warehousing costs are high and streets are congested but public transport infrastructure is prevalent.

BRIEF DESCRIPTION OF THE DRAWINGS

Various ones of the appended drawings merely illustrate example embodiments of the present disclosure and should not be considered as limiting its scope.

FIG. 9A is a diagram illustrating an example drone delivery route, according to some example embodiments.

DETAILED DESCRIPTION

Figure 1:
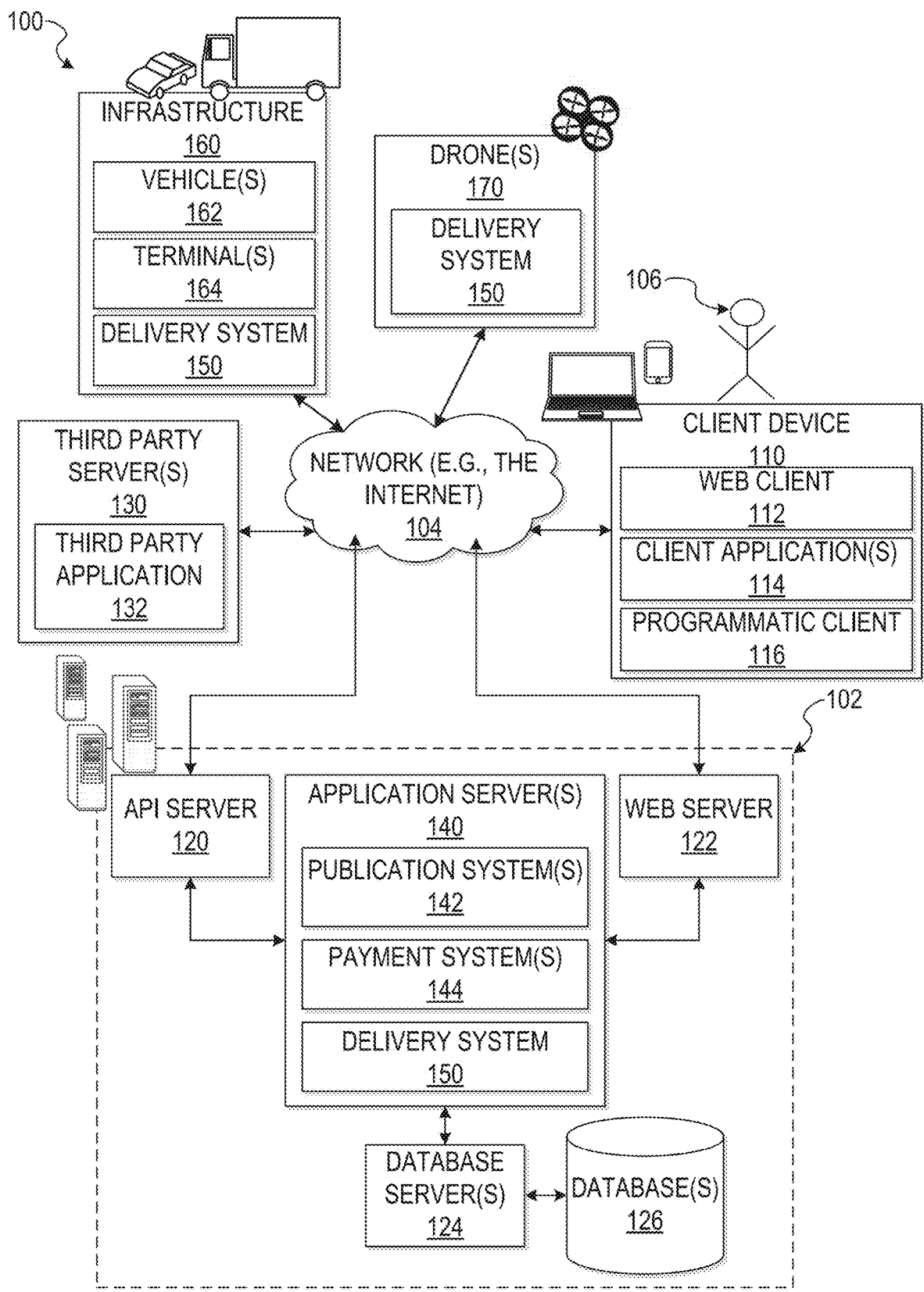
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

While it is generally simple to consolidate numerous packages and move large numbers of parcels between large freight stations, it is often much less efficient to transport smaller numbers of goods to their final destinations. In various example embodiments described herein, drones (e.g., Unmanned Aerial Vehicles or "UAVs") are utilized to increase the efficiency of "last mile" delivery. Given the limitations of battery technologies, drones have a limited range and often need to be recharged once their batteries, or another energy source, are depleted. This has the potential to limit the areas in which drone delivery is possible to locations within a short distance of warehouses or freight stations. Furthermore, various example embodiments described herein can lessen drone traffic, which may be an eyesore as well as a safety risk. Example embodiments contemplate the use of existing public transportation infrastructure to deliver packages and drones to a particular public infrastructure terminal (e.g., a bus stop) where drone delivery commences, which can highly extend the effective range of drone delivery systems and alleviate some drone traffic.

Moreover, example embodiments described herein can lower setup costs of drone delivery by utilizing existing infrastructure. For example, a bus traveling along an existing bus route can deliver drones and packages to a bus stop within a predetermined radius of a package destination, and one or more drones can deliver one or more packages from the bus stop to the package destination.

Various example embodiments, using drones to deliver packages, allow for package delivery in areas difficult to reach. For example, various embodiments allow for package delivery to a roof, windowsill of a multi-story building or apartment, a backyard, a user-specified geolocation, or directly to a current user geolocation based on a geolocation of a user device (e.g., as determined via a GPS component of a mobile device such as a cellphone).

To initiate the process of drone delivery, in some embodiments, the delivery system receives a request, submitted by a user, to deliver an item using a drone (e.g., when the user purchases or posts an offer to sell the item on an e-commerce website). In a specific example, once the user submits his or her payment information on an e-commerce website (e.g., EBAY® or another website), the user is directed to a shipping options page that prompts the user to input a delivery address and provides the user with an option for drone delivery of the item. In such example embodiments, the delivery system receives this request for drone delivery of the item including location information of a drop-off destination. In some embodiments, the drop-off destination is a set physical location, such as a home address or an office address. In some embodiments, the drop-off destination is linked to geolocation data detected at a user device of the user (e.g., a smartphone, a wearable device, or a user's personal vehicle). For example, the user downloads an application on her smartwatch and provides permission via the application for the delivery system to access the geolocation data detected at the smartwatch of the user, and the delivery system uses the geolocation data of the smartwatch as the drop-off destination.

In some embodiments, the delivery system communicates an instruction to cause the package to be transported by the vehicles to a final terminal (e.g., a bus stop, train depot, or subway station). In example embodiments, the drone delivery system determines a drone delivery route and communicates an instruction to the drone to deliver the package to the drop-off destination via the determined drone delivery route.

In various embodiments, the delivery system accesses public infrastructure information including public infrastructure terminal locations and public infrastructure vehicle route information (e.g., "vehicle route information"). In some embodiments, the vehicle route information includes timing information or scheduling information.

Consistent with some embodiments, once the system determines the drop-off destination and a specified delivery time or range of times, the delivery system identifies a public infrastructure terminal from which the drone delivers the package to the drop-off destination. For example, the delivery system identifies a particular public infrastructure terminal closest, or near closest, in distance to the desired drop-off destination. In this example, the delivery system designates the identified closest terminal as the terminal from which the drone will deliver the package. In some embodiments, once the delivery system identifies the closest terminal, the delivery system communicates an instruction to transport the package to the identified public infrastructure terminal (e.g., the delivery system sends a message to a warehouse that has the package with an instruction to transport the package to the identified closest terminal).

In example embodiments, the delivery system receives an indication that the package has arrived at the identified public infrastructure terminal (e.g., a final terminal). In certain embodiments, the delivery system receives the indication that the package has arrived in response to a physical identifier affixed to the package (e.g., a Radio Frequency Identification (RFID) tag, an optical barcode, or a smart tag) that uniquely identifies the package being detected at the identified public infrastructure terminal. In other embodiments, the indication is received in response to an operator, administrator, or manager of the delivery system inputting data into the delivery system for each package that is brought to the identified public infrastructure terminal.

In various embodiments, the delivery system determines a drone delivery route from the identified public infrastructure terminal to the drop-off destination based on public infrastructure information (e.g., public transportation infrastructure data including public infrastructure terminal locations and public infrastructure vehicle route information). In an example where drone delivery is facilitated by trains and train routes, the delivery system determines a drone delivery route by finding a minimum or near-minimum route distance between an identified train depot and the drop-off destination. In further examples, the delivery system determines a three-dimensional delivery trajectory (e.g., defining the longitude, latitude, and altitude along the route) to guide the drone over power lines, above bridges, and around heavily forested areas.

Once the delivery system determines a drone delivery route, in various example embodiments, the delivery system communicates, to the drone, an instruction for the drone to deliver the package from the identified public infrastructure terminal to the drop-off destination using the drone delivery route. Once the delivery system communicates an instruction to the drone to deliver the package, in example embodiments, the drone picks up the package and flies along the determined drone delivery route to drop off the package at the drop-off destination.

It will be appreciated that "terminals" or "public transportation infrastructure terminals" as used herein are intended to include, but are not limited to, bus stops, train stations, harbors, shipyards, monorail stations, airports, vehicle charging stations, and subway stations. Furthermore, it will be appreciated that "vehicles" or "public transportation infrastructure vehicles" as used herein are intended to include, but are not limited to, trains, buses, cars, monorails, subways, driverless vehicles, bullet trains, boats, subways, and planes. Moreover, it will be appreciated that "drones" as used herein are intended to include Unmanned Aerial Vehicles ("UAVs"), quadcopters, quadrotors, unmanned aircraft, and multirotor unmanned aerial vehicles.

In some embodiments, the delivery system employs a "top-down" architecture that centrally determines the drone delivery routes, vehicles, terminals, and drones utilized for public infrastructure facilitated drone delivery. For example, in such a "top-down" based delivery system, the delivery system determines the packages and drones that are placed on specific vehicles, and which packages depart from certain terminals at certain times at the beginning of each day before delivery commences.

In other embodiments, the delivery system employs an "emergent" or "bottom-up" architecture that uses rules to govern behavior of the delivery system. For example, in an "emergent" based delivery system, local servers determine drone delivery routes (e.g., once a package and a drone arrive at a terminal, a server on the terminal parses through local geolocation data to determine a drone delivery route). Moreover, in an example "emergent" based delivery system, individual components of the delivery system recalculate the next delivery "step" after each previous "step" is completed (e.g., once a drone delivers a package and returns to a terminal, the delivery system determines a next vehicle arriving at the terminal that needs more drones to deliver packages, and the system will then send an instruction to the drone to board the identified vehicle when the identified vehicle arrives at the terminal). In example "emergent" embodiments, the delivery system identifies a vehicle to pick up a drone from a terminal after delivery based on one or more of: a minimum time for a vehicle to arrive at the terminal, number of packages on board each vehicle, and number of drones on board each vehicle.

An "emergent" system allows for system robustness when conditions have changed. In an example embodiment with "emergent" behavior, the delivery system accesses delivery status information that includes at least one of: a number of packages not yet delivered, package delivery deadlines, a number of drones on each specific bus, and a number of drones near any specific public infrastructure terminal. In various embodiments, the delivery system uses the delivery status information to update, at a periodic time interval or in response to changed conditions, which public infrastructure terminal a drone is transported to. In some embodiments, the delivery system determines that conditions have changed when delivery parameters reach a certain threshold or when the rate of change of parameters reaches a certain threshold rate.

With reference to FIG. 1, an example embodiment of a high-level network architecture 100 is shown. A networked system 102, in the example forms of a network-based marketplace or payment system, provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser, such as the INTERNET EXPLORER® browser developed by MICROSOFT® Corporation of Redmond, Washington State), client application(s) 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120. The programmatic client 116 can, for example, be a seller application (e.g., the Turbo Lister application developed by EBAY® Inc., of San Jose, California) to enable sellers to author and manage listings on the networked system 102 in an off-line manner, and to perform batch-mode communications between the programmatic client 116 and the networked system 102.

Users (e.g., the user 106) comprise a person, a machine, or other means of interacting with the client device 110. In some embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server(s) 140. The application server(s) 140 can host one or more publication system(s) 142, payment system(s) 144, and a delivery system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s)

142. The database(s) 126 also stores digital good information in accordance with some embodiments.

In an example embodiment, various public infrastructure, such as infrastructure 160, is communicatively coupled to the network 104. As shown in FIG. 1, the infrastructure 160 comprises, for example vehicle(s) 162, terminal(s) 164, and a variety of other public infrastructure. Also shown in FIG. 1, drone(s) 170 is communicatively coupled to the network 104. In some embodiments, the delivery system 150, or a portion of the delivery system 150, can be implemented on the infrastructure 160, the drone(s) 170, the client device 110, or the application server(s) 140. In these example embodiments, the infrastructure 160, the drone(s) 170, the client device 110, or the application server(s) 140 can work alone or in conjunction with one another. For example, a portion of the delivery system 150 included on the application server(s) 140 can exchange data with a portion of the delivery system 150 residing on the infrastructure 160, the drone(s) 170, the client device 110, or another device.

In various embodiments, the drone(s) 170 used to deliver packages have geolocation capabilities (e.g., GPS or WI-FI® triangulation). Moreover, in example embodiments, the drone(s) 170 are communicatively coupled to the delivery system 150. In some embodiments, the drone(s) 170 communicate through existing cellphone networks (e.g., 3G, 4G, 2G, WiMAX, or LTE) or through secure networks surrounding terminals associated with the delivery system.

Depending on the embodiment, the drone(s) 170 may have functionality to pick up one or more packages using one or more of the following: a latch mechanism, a hook, a claw mechanism, an adhesive, a vacuum mechanism, a magnetic attachment mechanism, a scooping mechanism, a box that closes around the item, a clip, or other various fasteners or locking mechanisms. For example, in some embodiments, the drone(s) 170 contains one or more threaded nuts that can be fastened to bolts located in predetermined positions of a standard box used for drone-assisted delivery. In other embodiments, the drone(s) 170 is equipped with an extendable, expandable claw mechanism configured to pick up a package and release it upon delivery.

Moreover, in various embodiments, the drone(s) 170 include optical recognition components operable to provide sensor data while in flight and identify objects such as package identifiers or valid drop-off destinations. In some embodiments, the drones 170 contain various sensors and programs operable to analyze health of drone components and send data concerning the drone health to the delivery system 150. For example, the drones 170 contain temperature sensors, system health tools, optical calibration programs, and other hardware health monitoring programs.

In some embodiments, the vehicle(s) 162 used to deliver the drone(s) 170 and packages to the terminal(s) 164 have geolocation capabilities (e.g., GPS or WI-FI® triangulation). Moreover, in example embodiments, the vehicle(s) 162 are communicatively coupled to the delivery system 150. In various embodiments, the vehicle(s) 162 communicate with the delivery system 150 and the other components of the delivery system 150 via phone networks, WI-FI®, and BLUETOOTH®. In example embodiments, the terminal(s) 164 are communicatively coupled to the delivery system 150. In various example embodiments, the terminal(s) 164 and vehicle(s) 162 have charging capabilities to recharge the drones 170 between drone flights.

In various embodiments, the drone(s) 170 are configured to attach (e.g., "dock") on the vehicles 162 (e.g., a bus) and terminal(s) 164 (e.g., a bus stop or another public infrastructure facility) when they are not in flight. In an example embodiment, when the drone 170 docks at the terminal 164, a battery component or other power source of the drone 170 is charged while the drone 170 is in-between flights. In various embodiments, the drones 170 can dock at the terminal 164 (e.g. on a bus stop roof) to recharge and wait for the vehicle 162 to arrive. In another example, while the drones 170 dock on the vehicle 162, the drones 170 are charged by the vehicle 162 as well as transported to a particular terminal 164 to commence drone delivery of a package. In example embodiments where the drones 170 attach to buses, the drones 170 attach to one or more of: a side of the bus, a top of the bus, a back of the bus, or a front of the bus. In various embodiments, the docking mechanism also includes a drone lock to prevent drones 170 from falling, especially when the vehicle 162 is in motion. In other embodiments, the drones 170 are attached to crates with compartments that are used to carry packages. For example, the crates contain docking stations or compartments to carry drones, and drones are placed onto the crates before crates containing both packages and drones are loaded onto the vehicle(s) 162.

In some embodiments, the vehicle(s) 162 are vehicles that are not used to transport passengers, such as customized trucks or autonomous vehicles that travel to the terminal(s) 164 to deliver the drones 170 and packages to locations where the drones 170 depart for final mile package delivery to a drop-off destination. For example, the vehicles 162 travel in routes specifically created to deliver packages to the terminals 164. In some of these embodiments, the terminals 164 are drone stations specifically created for the drone delivery system. In these embodiments, a drone station contains one or more of: a power source and charging mechanism to charge the drones 170 between flights, an item receptacle for users to drop off items for drone delivery, secure storage to store packages that the drones 170 will deliver from the drone station, and a local database accessible by the delivery system 150 that contains delivery route information.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 provides a number of publication functions and services to the users that access the networked system 102. The payment system(s) 144 likewise provides a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment system(s) 144 may form part of the publication system(s) 142.

In some implementations, the delivery system 150 provides functionality to identify a public infrastructure terminal from which the drone delivers the package, cause transportation of the package to the identified public infrastructure terminal, determine a drone delivery route from the identified terminal to a drop-off destination, and communicate the drone delivery route to the drone 170 in response to the user's request for drone delivery. In some embodiments, the delivery system 150 communicates with the client device 110, the third party server(s) 130, the publication system(s) 142 (e.g., retrieving listings), the infrastructure 160, the drone(s) 170, and the payment system(s) 144 (e.g., purchasing a listing). In an alternative embodiment, the delivery system 150 is a part of the publication system(s) 142. The delivery system 150 will be discussed further in connection with FIGS. 2-19 below.

Further, while the network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., the publication system(s) 142, the payment system(s) 144, and the delivery system 150) can also be implemented as stand-alone software programs, which do not necessarily have networking capabilities.

Figure 2:
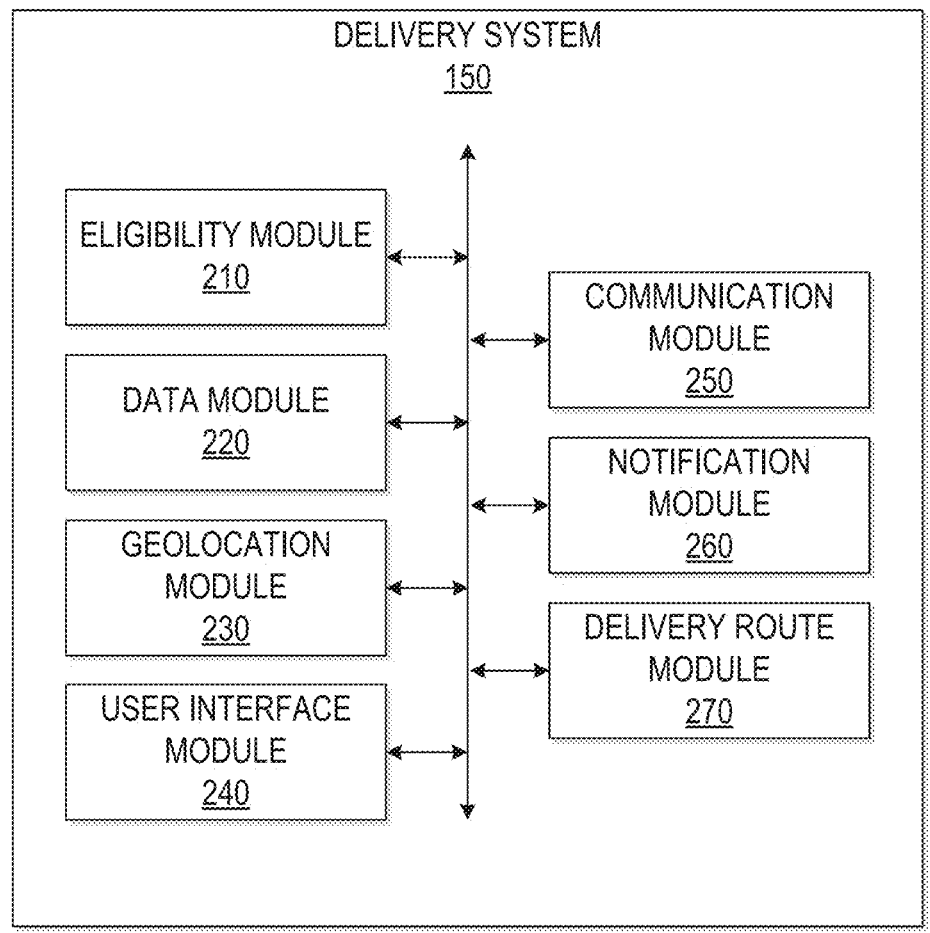
FIG. 2 is a block diagram showing example components of a delivery system, according to some example embodiments.

FIG. 2 is a block diagram of the delivery system 150 that provides functionality to communicate an instruction to communicate a delivery route to a drone (e.g., drone(s) 170 of FIG. 1) in response to a user's request for drone delivery, according to some embodiments. In an example embodiment, the delivery system 150 includes an eligibility module 210, a data module 220, a geolocation module 230, a user interface module 240, a communication module 250, a notification module 260, and a delivery route module 270. All or some of the modules 210-270 of FIG. 2, communicate with each other, for example, via a network coupling, shared memory, and the like. It will be appreciated that each module can be implemented as a single module, combined into other modules, or further subdivided into multiple modules. Other modules not pertinent to example embodiments can also be included, but are not shown.

In various embodiments, the eligibility module 210 determines whether the item is eligible for drone delivery based on various item attributes. The eligibility module 210 accesses drone delivery eligibility data, stored for example within database(s) 126, to determine whether a certain item is eligible for drone delivery. In various embodiments, the eligibility module 210 receives a request for delivery that includes drone delivery request data (e.g., item attributes, drop-off destination information, and delivery window information). For example, item attributes used to determine eligibility may include, but are not limited to, item dimensions, item weight, item perishability, item cost, item fragility, item price, or time sensitivity of the item (e.g., concert tickets that have no value after the concert date).

In example embodiments, the eligibility module 210 compares the drone delivery request data to threshold or acceptable values of eligibility data to determine whether the package is eligible for drone delivery (e.g., UAV-assisted delivery). For example, the eligibility module 210 receives a request for delivery of an item that weighs 20 kg and is not fragile. In this example, the eligibility module 210 compares this drone delivery request data to the threshold value of [weight<35 kg] and acceptable value of [fragile=NO] to determine eligibility. In the same example, since the comparison shows that the 20 kg, non-fragile item weighs less than the threshold value of 35 kg and matches the acceptable value of [FRAGILE=NO], the eligibility module 210 determines that the package is eligible for drone delivery. In some embodiments, the eligibility module 210 exchanges network communications with the user interface module 240, where the user interface module 240 generates a user interface notifying the user of delivery eligibility or ineligibility based on the eligibility status determined by the eligibility module 210.

The communication module 250, in various embodiments, is in signal communication with the eligibility module 210 to refuse the request for delivery using a drone if the communication module 250 determines the package is ineligible for drone-assisted delivery. The communication module 250 also, in various embodiments, accepts the request for drone delivery if the eligibility module 210 determines the package is eligible for drone-assisted delivery.

In some embodiments, the eligibility module 210 determines eligibility before allowing the user to request drone delivery and, in some embodiments, the user interface module 240 generates a user interface that does not allow the user to select a drone delivery option if the eligibility module 210 determines ineligibility. In some embodiments, the eligibility module 210 determines drone delivery eligibility after the user has requested drone delivery. In some embodiments, once the eligibility module 210 determines ineligibility for drone delivery, the communication module 250 refuses the request for drone delivery (e.g., the user is prompted to select another delivery option or a default delivery option is automatically selected).

The data module 220 provides functionality to access, retrieve, obtain, store, and otherwise manage a wide variety of data stored locally or remotely. For instance, the data module 220 accesses various data stored by the database(s) 126, the third party server(s) 130, or another storage repository. For example, the data module 220 accesses public infrastructure information that includes, but is not limited to, vehicle route information, public infrastructure terminal information, vehicle timing information, and "no-fly zone" data. In other instances, the data module 220 accesses delivery status information that includes at least one of: the number of packages not yet delivered, package delivery deadlines, the number of drones on each specific bus, or the number of drones near any specific public infrastructure terminal.

The geolocation module 230 provides various identification and location functionality. For example, based on the public infrastructure information, accessed by the data module 220, including public infrastructure terminal location information and the geolocation information of the drop-off destination, the geolocation module 230 identifies a public infrastructure terminal from which the drone (e.g., Unmanned Aerial Vehicle or "UAV") delivers the package to the drop-off destination. In example embodiments, the geolocation module 230 determines a pick-up vehicle that picks up the drone after the drone delivers a package and the drone returns to the public infrastructure terminal. In some embodiments, the geolocation module 230 determines the pick-up vehicle before the drone delivers the package to the drop-off destination. In other embodiments, the geolocation module 230 determines the pick-up vehicle after the drone delivers the package to the drop-off destination. The geolocation module 230 exchanges network communications with the data module 220 and the communication module 250. In various embodiments, the geolocation module 230 uses the delivery status information accessed by the data module 220 to update, at a periodic time interval or in response to changed conditions, the public infrastructure terminal a drone is transported to.

The user interface module 240 provides functionality for generating various user interfaces. For instance, the user interface module 240 creates or generates a user interface that indicates a current geolocation of the drone while performing a delivery using geolocation data (e.g., a latitude, a longitude, an altitude, and a timestamp). In another example, the user interface module 240 creates a user interface allowing a user to request drone delivery or to indicate that they received a package. The user interface module 240 exchanges network communication with, for example, the database server(s) 124, the client device(s) 110, and the third party server(s) 130. In various implementations, the user interface module 240 presents or causes presentation of information (e.g., visually displaying information on a screen, acoustic output, haptic feedback). Interactively presenting information is intended to include the exchange of information between a particular device and the user. The user may provide input to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors). It will be appreciated that the user interface module 240 provides many other user interfaces to facilitate functionality described herein.

The communication module 250 provides a variety of communication functionality such as transmitting instructions to other components of the delivery system 150, receiving delivery requests, and various other communications. In some implementations, the communication module 250 provides functionality to receive, using at least one hardware processor of a machine, a request to deliver a package to a designated location utilizing a drone. For example, the communication module 250 receives data corresponding to the request for the delivery containing geolocation information of the drop-off destination (e.g., designated location) and timing information (e.g., a user-specified delivery time). The communication module 250 exchanges network communications with, for example, the database server(s) 124, the client device(s) 110, and the third party server(s) 130.

Furthermore, the communication module 250 receives data corresponding to the public infrastructure terminal identified by the geolocation module 230 and communicates an instruction to the delivery system 150 to transport the package to the identified public infrastructure terminal in various embodiments. Additionally, the communication module 250 exchanges network communication with one or more third party server(s) 130 and client device(s) 110, and communicates the instruction to transport the package by sending an instruction to one or more third party server(s) 130 or to the operator of a public transportation vehicle through the operator's client device 110.

In various embodiments, the network communication can operate over wired or wireless modalities. Web services are intended to include retrieving information from the third party server(s) 130, the database(s) 126, and the application server(s) 140. In some implementations, information retrieved by the communication module 250 comprises data associated with the user (e.g., user profile information from an online account, social network service data associated with the user), data associated with one or more items listed on an e-commerce website (e.g., images of the item, reviews of the item, item price), or other data to facilitate the functionality described herein. In some implementations, the communication module 250 communicates instructions to the drone(s) 170, for example an instruction to return from a public infrastructure terminal to a particular public infrastructure vehicle when the particular public infrastructure vehicle arrives at the public infrastructure terminal.

Further, it will be appreciated that "communicating" as used herein is intended to include communicating information or instructions to a particular device that is operable to perform one or more actions based on the communicated information or instructions. In various embodiments, such devices include drone(s) 170, vehicle(s) 162, terminal(s) 164, and client device(s) 110.

The notification module 260 provides a variety of notification functionality. For example, the notification module 260 receives an indication that a package has arrived at the public infrastructure terminal identified by the geolocation module 230. In this example, the notification module 260 receives data corresponding to the physical presence of a package (e.g., a unique identifier such as an RFID tag or a QR code that is scanned at the identified public infrastructure terminal). The notification module 260 exchanges network communications with, for example, the database server(s) 124, the client device(s) 110, and the third party server(s) 130.

The delivery route module 270 provides route identification functionality and determines, using at least one hardware processor of a machine, a drone (e.g., UAV) delivery route from the public infrastructure terminal (e.g., identified by the geolocation module 230) to the drop-off destination (e.g., designated location). The delivery route module 270 determines the delivery route based on geolocation data stored within the database(s) 126, consistent with some embodiments. For example, geolocation data is stored as one or more of two-dimensional (2-D) coordinates, three-dimensional (3-D) coordinates (also referred to as Cartesian coordinates), vector map data, raster map data, and so forth. In various example embodiments, the delivery route module 270 accesses a database of available airspace stored (e.g., database(s) 126), and determines a shortest or near-shortest vector constrained within available airspace that starts at the public infrastructure terminal identified by geolocation module 230 and ends at the drop-off destination, storing this shortest or near-shortest vector as the drone delivery route within database(s) 126. In various embodiments, the delivery route module 270 accesses regulatory and weather data used to determine accessible airspace. For example, if the delivery system 150 is implemented in a region where drones cannot fly at an altitude above 400 feet, this regulatory limitation will be accessible to the delivery route module 270 for use in determining a delivery route. In another example, the delivery route module 270 accesses weather data, such as current weather conditions (e.g., a high wind speed or a heavy rain), to determine the delivery route (e.g., avoiding areas with lots of trees and bridges during windy periods to avoid collisions).

In various embodiments, the communication module 250 receives sensor data collected by the drone when in flight. In various embodiments, this sensor data includes wind speed, temperature, humidity, air pressure, and geolocations where drone flight was unsuccessful (e.g., areas that were previously open airspace, but a new building or bridge or tree now blocks drones from flying through that airspace). In these embodiments, the delivery route module 270 accesses the sensor data received by the communication module 250 when the drone travels along the drone delivery route. In some embodiments, recent sensor data is stored within the database(s) 126 while the delivery route module 270 determines whether any delivery parameters have changed (e.g., wind speed has increased in a certain area or previously available airspace has recently been blocked by a bridge or a tree). In further embodiments, the data module 220 compares the received sensor data with data stored within database(s) 126 (e.g., geolocation data), and the data module 220 stores the sensor data if the comparison indicates a change that exceeds or transgresses a threshold level. In some embodiments where the delivery system 150 receives sensor data of geolocations where drone flight was unsuccessful, the data module 220 accesses a database containing acceptable routes within a predetermined radius of each public infrastructure terminal, and the delivery route module 270 compares the sensor data with the geolocation data of the acceptable routes database. In these embodiments, the delivery route module 270 modifies the acceptable routes database to exclude the geolocations where drone flight was unsuccessful.

Figure 3:
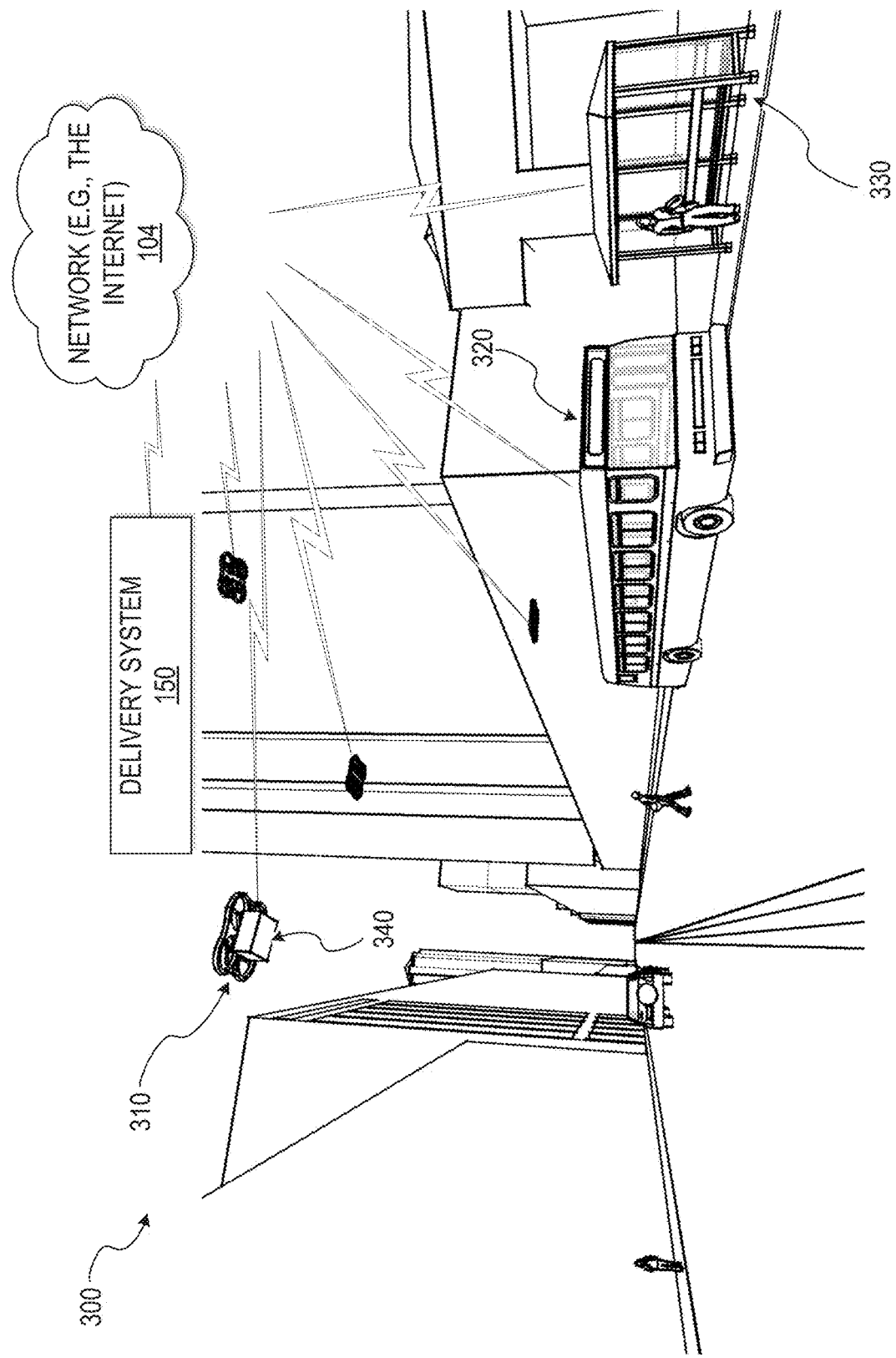
FIG. 3 is a diagram illustrating a public transportation infrastructure facilitated drone delivery system, according to some example embodiments.

FIG. 3 is a diagram illustrating an example of the delivery system 150, after the communication module 250 has communicated an instruction for a drone to deliver a package from the identified public infrastructure terminal to the drop-off destination using the drone delivery route identified by the delivery route module 270. A vehicle 320 transports a package 340 to a public infrastructure terminal 330 identified by the geolocation module 230. The drone 310, after picking up the package 340, travels along the drone delivery route identified by the delivery route module 270. In the diagram 300, the drone 310, the vehicle 320, and the terminal 330 are communicatively coupled to the network 104. In the example diagram 300, the drone 310, the vehicle 320, and the terminal 330 are communicatively coupled to the delivery system 150 via the network 104 and communicate with each other via the network 104.

Figure 4:
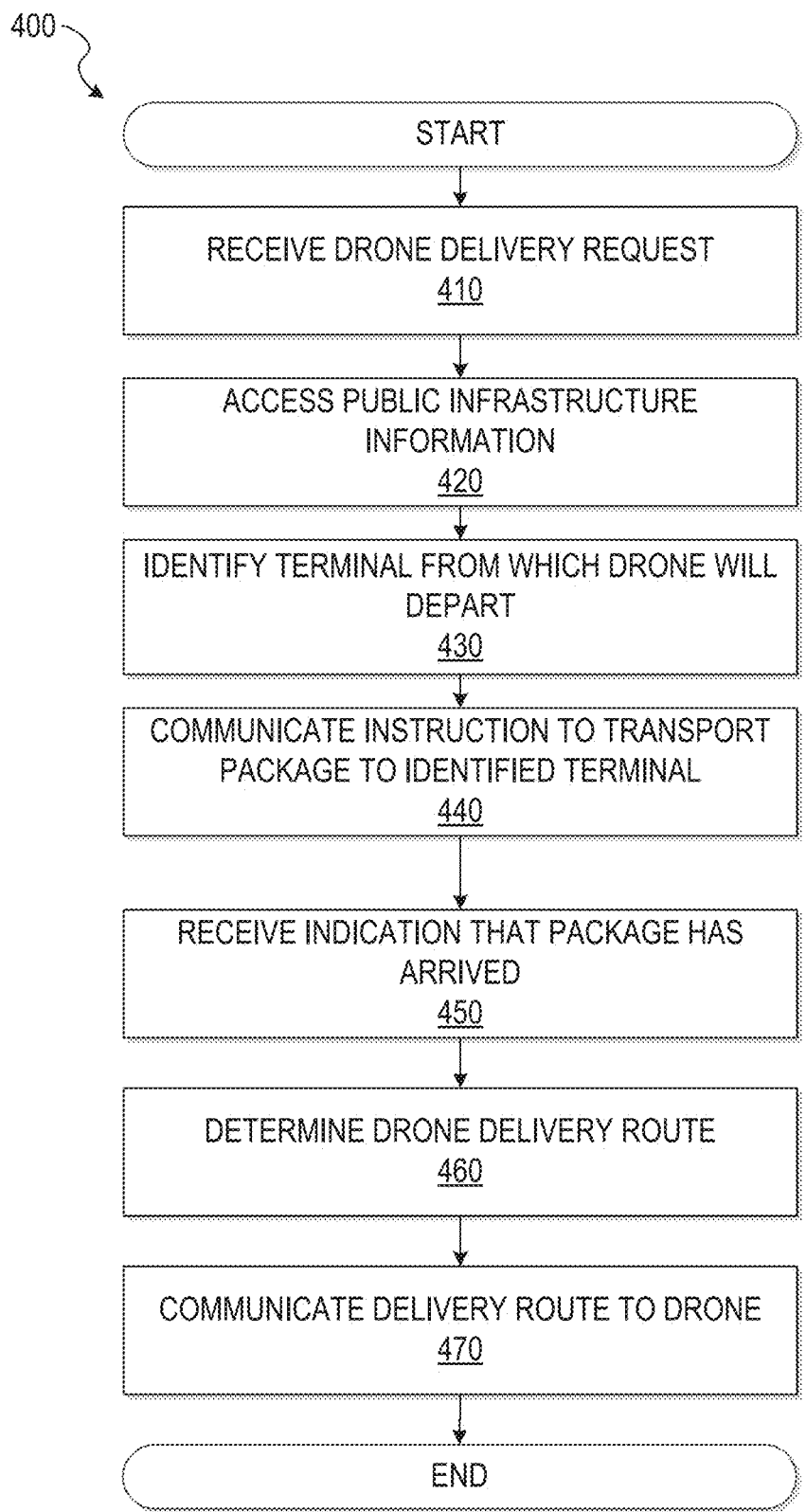
FIG. 4 is a flow diagram illustrating an example method for communicating a public transportation facilitated delivery route to a drone in response to a user's request for drone delivery, according to some example embodiments.

FIG. 4 is a flow diagram illustrating an example method 400 for public transport infrastructure facilitated drone delivery. The operations of the method 400 can be performed by components of the delivery system 150, and are so described below for the purposes of illustration.

At operation 410, the communication module 250 receives a request for drone delivery of an item. The request for drone delivery includes location information of the drop-off destination. In various embodiments, the user interface module 240 generates a user interface that allows the user to request drone delivery. For example, the user selects a check box to request drone delivery located within a shipping details page on an e-commerce website (e.g., EBAY®, or another website). In further embodiments, the eligibility module 210 refuses the drone delivery request if the user does not provide a shipping address or another specified geolocation (e.g., drop-off destination).

At operation 420, the data module 220 accesses public infrastructure information (e.g., public transport infrastructure data). In example embodiments, the public infrastructure information is stored within the database(s) 126. In various embodiments, the public infrastructure information includes vehicle route information and terminal location information. The vehicle route information includes, for instance, geolocation data of vehicle routes, timing information or scheduling information (e.g., bus schedules, train schedules), and vehicle information (e.g., height of vehicle, number of drones per vehicle, number of packages per vehicle, number of passengers per vehicle). The terminal location information includes, for example, geolocation data of a plurality of public infrastructure terminals. The geolocation data of the plurality of public infrastructure terminals includes, for example, two-dimensional coordinates (e.g., a latitude and a longitude) or three-dimensional coordinates (e.g., a latitude, a longitude, and an altitude) for respective terminals of the plurality of public infrastructure terminals. The geolocation data of the plurality of public infrastructure terminals is stored, for example, within the database(s) 126 as a raster map or a vector map. In some embodiments, the public infrastructure information is stored as an array with each element of the array representing a different public transportation route. In an example embodiment, various data is stored in association with the public transportation route such as locations of public transportation terminals and the associated times for vehicles to stop at each terminal along the route. In some embodiments, the locations of terminals are stored as latitude/longitude pairs.

At operation 430, the geolocation module 230 identifies the public infrastructure terminal from which the drone will depart to deliver the package to the drop-off destination. In example embodiments, the geolocation module 230 identifies the terminal from which the drone will depart based on the public infrastructure information (e.g., accessed by data module 220 as described above in connection with operation 420). In some embodiments, the geolocation module 230 identifies the public infrastructure terminal based on one or more of the following: the minimum distance (or nearly minimum distance) between the drop-off destination location and the location of any public transportation terminal within the public transportation infrastructure database, the number of drones that will be in the same area at the same time, the specified delivery time or range of times, traffic data, weather forecast data, or the location of identified "no-fly zones" (e.g., an airport or a military base lies between a public transportation terminal and a drop-off destination).

In a specific example of the delivery system 150 implementing "top-down" architecture, the geolocation module 230 recognizes pre-defined "zones" stored within database(s) 126, or another storage device, linked to specific public infrastructure terminals so that any package with a drop-off destination within a particular pre-defined zone can be delivered from the specific public infrastructure terminal. In embodiments where the delivery system 150 is implemented via the "top-down" architecture, the geolocation module 230 determines the boundaries of the zones based on distance from the specific public infrastructure terminal, the presence of "no-fly zones," and distance from other public infrastructure terminals.

In an example of the delivery system 150 implemented via the "emergent" (e.g., "bottom-up") architecture, the geolocation module 230 identifies the public infrastructure terminal from which the drone departs for delivery by analyzing the information accessed by the data module 220 after the communication module 250 receives the user's request for drone delivery. In some "emergent" based example embodiments, the geolocation module 230 re-determines the public infrastructure terminal at pre-determined time intervals or when certain conditions are met. For example, if the data module 220 accesses data such that the geolocation module 230 identifies that there are more than a threshold number of packages departing from a specific public infrastructure terminal, the geolocation module 230 may identify a different public infrastructure terminal in order to avoid congestion or a delayed delivery time.

At operation 440, the communication module 250 communicates an instruction to cause transportation of the package to the identified public infrastructure terminal. For example, the communication module 250 communicates the instruction to cause transportation of the package to the identified public infrastructure terminal to a third party server 130 within a warehouse. In various embodiments, the instruction is viewed by a warehouse worker or employee who labels and sorts packages at the warehouse. In other embodiments, the instruction causes an automated sorting process to divert the package to the correct location. In embodiments where packages are transported via the vehicles, the packages can be contained within pre-filled crates containing compartments in which packages are placed. The pre-filled crates are loaded onto a particular vehicle before the particular vehicle departs. In some embodiments, the crates are loaded in such a way that packages that have to be taken out first are placed in a particular position that is easiest to reach to avoid rearranging the packages. In various embodiments, the crates are equipped with a mechanism to feed the packages to the drones for delivery (e.g. a conveyor belt.) In other example embodiments, the packages are placed into lockers within the vehicle for storage.

In an example embodiment, pre-filled crates of packages are loaded onto vehicles prior to drones delivering the packages. For example, the communication module 250 sends an instruction to a warehouse, containing a list of eligible packages that need to be transported. In some embodiments, the list of eligible packages is sorted by drop-off destination. In further embodiments, the list of eligible packages is sorted so that packages going to the same public infrastructure terminal identified by the geolocation module 230 are placed together. In example embodiments, the packages are added to a crate containing compartments where packages are placed. For example, the list of eligible packages contains 37 packages, which are loaded into a crate containing 50 compartments. In some embodiments, the crates are delivered from the warehouse to a vehicle, and loaded onto the vehicle. In embodiments where crates are delivered to a vehicle, drones are stored within the vehicle and ready to begin package distribution as the vehicle travels along its route. In some examples, the drones pick up packages from the crate and depart with one or more packages from the vehicle to the drop-off destination(s) along a route determined by the delivery route module 270 from a current location of the vehicle to the drop-off destination. In some examples, the entire crate or part of the crate is delivered to a terminal along with one or more drones, and the delivery route module 270 determines a drone delivery route from the terminal to the drop-off destination for one or more packages delivered to the terminal.

In some embodiments, package sorting and tracking is facilitated using a unique physical identifier for each package (e.g., a barcode, or another tag, physically affixed to the package that encodes an identifier that uniquely identifies the package). The physical identifier may be one or more of an RFID tag, a smart tag, a barcode, and a QR code. For example, the physical identifier is embedded inside the standard box used to transport the item. In various embodiments, the notification module 260 receives a package check-in indication in response to the tag of the package being scanned, or otherwise detected (e.g., RFID tag detection, barcode scan, or QR code scan), at various checkpoints such as on a conveyor belt within the warehouse, leaving the warehouse, entering a public transportation vehicle, exiting a public transportation vehicle, and so on. In yet other embodiments, an employee identifies the package manually (e.g., by receiving a unique number identifier or generated code inputted through the system through a user interface generated by user interface module 240).

In various embodiments, the data module 220 accesses a package database contained within database(s) 126 that stores information associated with each package that is delivered via the delivery system 150 (e.g., dimensions, weight, cost, perishability, fragility), and the delivery system 150 creates an event log within database(s) 126 associated with the package when the unique physical identifier of the package is detected or scanned. In an example embodiment, instruction to cause transportation of the package to the identified public infrastructure terminal, generated and communicated by communication module 250, includes a specification of vehicle stop locations and vehicle stop times where packages are to be loaded onto a vehicle and removed from a vehicle. In an embodiment where packages are transported using buses and bus routes, the geolocation module 230 may determine that the package is loaded onto a first bus at a first time, be taken off of the first bus at a certain bus stop, and be loaded onto a second bus at a second time from which the package will reach the identified public infrastructure terminal where drone delivery commences.

In embodiments where a package is transported from one vehicle to another until it reaches the final terminal determined by the geolocation module 230, parcel transfer from vehicle to vehicle is facilitated using one or more of a conveyor belt, pneumatic tubes, a robotic mechanism to carry parcels from one vehicle to another, or human-assisted sorting methods. In yet other embodiments, vehicles such as trucks or cars that are specifically used to transport parcels to public infrastructure terminals bring the parcels at least part of the way to the final terminal determined by the delivery system 150. In various embodiments, the vehicle operator is alerted once parcel transfer is complete. Furthermore, the delivery system 150 hinders the vehicle from moving until parcel transfer is complete.

At operation 450, the notification module 260 receives an arrival indication when the package arrives at the public infrastructure terminal identified by geolocation module 230 (discussed above in connection with operation 430). For example, the arrival indication is received in response to detecting the physical identifier that identifies the package (e.g., an RFID code, optical barcode, or smart tag). In other embodiments, the indication that the package has arrived at the public infrastructure terminal is received in response to a unique identifier (e.g., uniquely generated alphanumeric code) that is manually inputted into the delivery system 150 for each package that is brought to the identified public infrastructure terminal through a user interface generated by user interface module 240.

At operation 460, the delivery route module 270 determines a drone delivery route based on public infrastructure information stored within database(s) 126 (e.g., public transportation infrastructure data including public infrastructure terminal locations and public infrastructure vehicle route information). In some embodiments, the delivery system 150 determines the drone delivery route by finding the minimum or near-minimum route distance given location information of the public infrastructure terminal and location information of the drop-off destination. In some of these embodiments, the delivery route module 270 identifies the drone delivery route taking certain delivery parameters into account. These delivery parameters include, for example, one or more of a shortest or near-shortest transit time from the package origin to the geolocation of the drop-off destination, a number of packages being marked for delivery to the identified public infrastructure terminal, weather conditions, airspace restrictions, proximity to "no-fly zones" (e.g., areas above or near airports, schools, military bases), or the presence of airspace that is difficult for drones to navigate (e.g., areas with lots of bridges, highway overpasses, bushy trees, power lines where a direct and unobstructed route would be impossible). In some embodiments, the delivery route module 270 determines a two-dimensional drone delivery route (e.g., a trajectory defined by a longitude and a latitude). Alternatively, the delivery route module 270 determines a three-dimensional drone delivery route (e.g., a trajectory defined by a longitude, a latitude, and an altitude).

In operation 470, the communication module 250 communicates an instruction to the drone to deliver the package from the identified public infrastructure terminal to the drop-off destination using the drone delivery route. The communication module 250 may communicate the instruction to the drone via, for example, WI-FI®, BLUETOOTH®, NFC, mobile networks (e.g., 2G, 3G, 4G, LTE, and WiMax). In some embodiments, the communication module 250 sends a delivery confirmation message to a user device of the user (e.g., a smartphone, smartwatch, or a computer). In some instances, the confirmation message includes a user inquiry asking whether the user is ready to receive the package. In some of these embodiments, the communication module 250 does not send the instruction for the drone to deliver the package if the user does not confirm the delivery confirmation message within a certain amount of time (e.g., twenty minutes).

In various embodiments, the drone(s) 170 change vehicles at various points to facilitate delivery. For example, a drone carrying a package departs a first vehicle, and the delivery route module 270 determines a route from the first vehicle to a second vehicle which transports the drone and the package towards the drop-off destination. In another example where the drone departs the first vehicle while carrying a package, the geolocation module 230 determines a waiting terminal where the drone waits for the second vehicle. In this example, the delivery route module 270 determines a route from the first vehicle to the waiting terminal and another route from the waiting terminal to the second vehicle. In the same example, the communication module 250 communicates an instruction for the drone to travel, while carrying the package, along the routes determined by delivery route module 270 from the first vehicle to the waiting terminal and from the waiting terminal to the second vehicle identified by geolocation module 230.

In additional embodiments, drones that are not carrying packages travel from a first vehicle to a second vehicle identified by geolocation module 230 when drones need to be transported to a route other than the route traveled by the first vehicle (e.g., when more drones are needed on a different route to drop off packages). The delivery route module 270 determines a route from the first vehicle to an interim terminal where the drone stays until boarding a second vehicle when the second vehicle arrives at the interim terminal. Subsequently, the communication module 250 communicates instructions for the drone to travel from the first vehicle to the interim terminal and from the interim terminal to the second vehicle.

Figure 5:
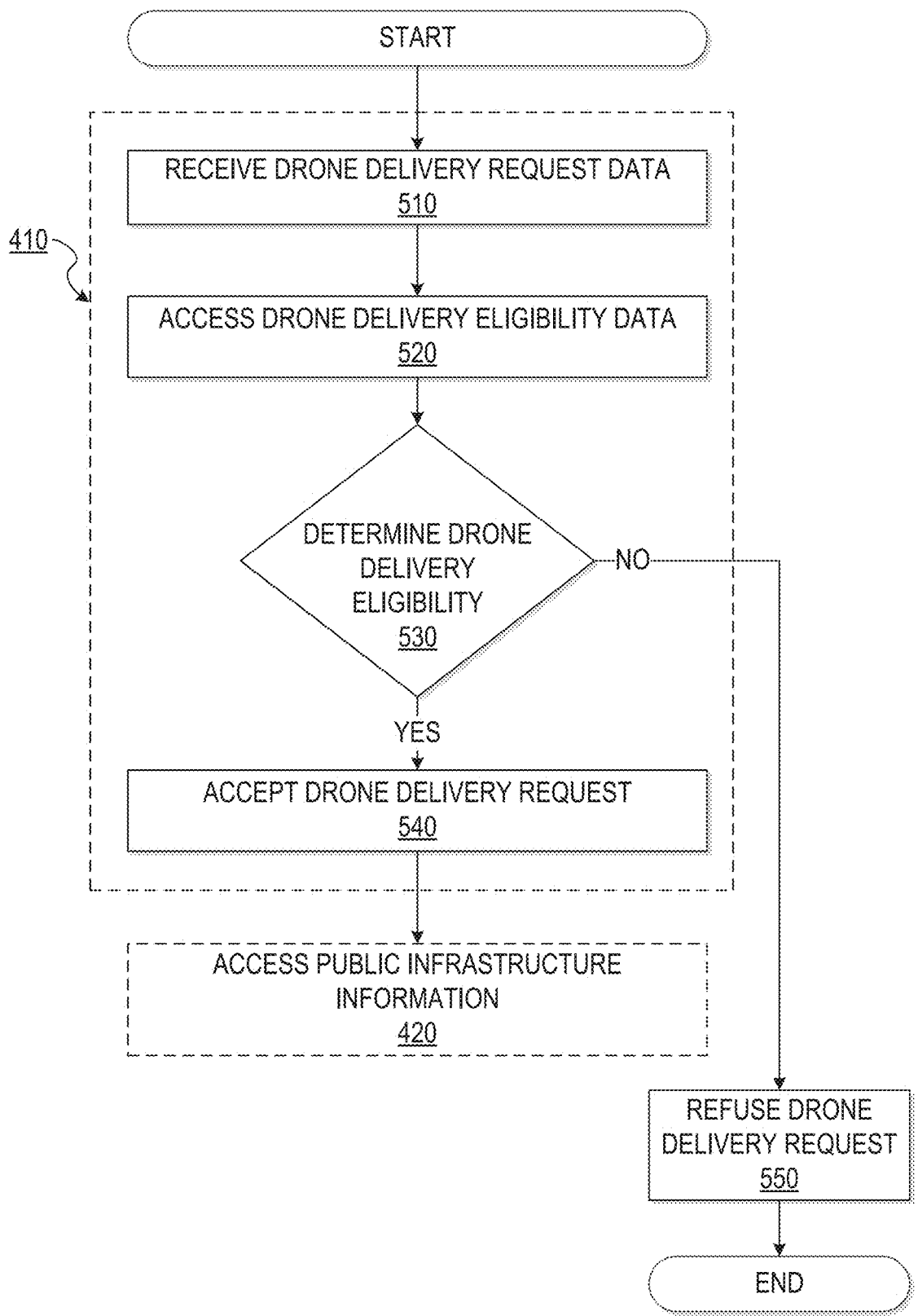
FIG. 5 is a flow diagram illustrating an example method to determine eligibility for drone delivery, according to some example embodiments.

FIG. 5 is a flow diagram illustrating further example operations of operation 410, discussed above, for receiving the drone delivery request. In an example embodiment, operation 410 includes the additional operations of FIG. 5 to determine eligibility for drone delivery based on drone delivery request data included in the drone delivery request.

At operation 510, communication module 250 receives the drone delivery request that includes drone delivery request data. In some example embodiments, the drone delivery request data includes location information of the drop-off destination, delivery parameters such as a desired drop-off time, or item attributes. The item attributes are, for example, inputted as item data by an item seller or determined by querying a database for items sold in the past with titles above a threshold level of similarity in order to find the mean, median, or most common value for each item attribute. For example, the item attributes used to determine eligibility may include, but are not limited to, item dimensions, item weight, item perishability, item cost, and item fragility.

At operation 520, according to various embodiments, subsequent to the communication module 250 receiving the drone delivery request including the drone delivery request data, the data module 220 accesses drone delivery eligibility data stored, for example, within database(s) 126. The drone delivery eligibility data includes, but is not limited to, item dimensions, item weight, item perishability, item cost, and item fragility. In an example embodiment, the data module 220 accesses the drone delivery eligibility data and communicates the drone delivery eligibility data to the eligibility module 210. In various embodiments, the drone delivery eligibility data is stored in the form of threshold values above or below which an item is determined to be ineligible for drone delivery (e.g., products that cost more than $100 are ineligible; products with length over 15 inches are ineligible; products that weigh more than 30 pounds are ineligible). Alternatively, the drone delivery eligibility data is stored as a Boolean value, where a value of YES or NO indicates ineligibility (e.g., [perishable=NO] does not show ineligibility; [fragile=NO] leads to a determination of ineligibility).

At operation 530, the eligibility module 210 compares the drone delivery request data to the drone delivery eligibility data to determine drone delivery eligibility. In various embodiments, if an eligibility data element leads to a determination of ineligibility, the communication module 250 refuses the user's drone delivery request (indicated by "NO" in FIG. 5) and proceeds to operation 550. Alternatively, if the eligibility module 210 determines that the package is eligible for drone delivery (indicated by "YES" in FIG. 5), the communication module 250 accepts the drone delivery request at operation 540 and proceeds to access the public infrastructure information at operation 420 of FIG. 4. In some embodiments, the eligibility module 210 determines the drone delivery eligibility based on the dimensions of products for sale, comparing the product dimensions to the pre-determined dimensions of standardized delivery boxes optimized for drone delivery. In some of these embodiments, the eligibility module 210 determines the standardized box size that is required, and the communication module 250 indicates to the user the box size that is required. In these embodiments, if the eligibility module 210 determines that the product does not fit into a standardized delivery box optimized for drone delivery, the communication module 250 refuses the drone delivery request.

In some embodiments, the eligibility module 210 determines items that are ineligible for drone delivery based on their item attributes before a user requests drone delivery, and bars the user from requesting drone delivery for ineligible items (e.g., does not provide the user with a drone-assisted delivery option). Alternatively, the eligibility module 210 does not determine eligibility until drone delivery request data is received at operation 510.

In some embodiments, the user interface module 240 generates a shipping options user interface configured to receive the user's shipping address and the request for delivery using the drone. In further embodiments, the user interface module 240 generates a user interface to prompt the user to enter a desired delivery date and time. The desired delivery date and time is a range of time (e.g., Friday, June12$^{th}$ from 3:00 pm to 5:00 pm). Depending on the embodiment, the delivery date is a month and day (e.g., June 12$^{th}$) or a preferred day of the week (e.g., Friday). In some embodiments, the eligibility module 210 determines eligibility for drone delivery based on the specified time window. For example, the eligibility module 210 computes possible ranges of arrival times based on the times where public transportation vehicles stop at the public transportation terminals closest to the specified drop-off destination. In an example embodiment, the eligibility module 210 determines ranges of arrival times by adding the estimated drone transit time (e.g., based on distance from the terminal to the delivery location) and a margin of error (e.g., 20% error to account for obstacles, effect of wind, and other variables) to the estimated public transportation terminal arrival time.

For example, the user may request delivery between 10:00 am and 11:30 am, and the data module 220 accesses data showing that a closest bus stop has buses arriving at 9:43 am, 10:03 am, 10:23 am, 10:43 am, 11:03 am, 11:23 am, and every 20 minutes afterwards. In this specific example, the eligibility module 210 determines an estimated drone transit time of 23 minutes (e.g., 3 minutes for a drone to identify and grab a package, and 20 minutes of flight based on the distance from the bus stop to the delivery destination). The eligibility module 210 determines that the 20% margin of error is 4.6 minutes, and modifies the estimated drone transit time using this margin to find an estimated drone arrival range of 18.4-27.6 minutes after the bus arrives at the bus stop. Adding this range to each bus stop arrival time, the eligibility module 210 determines that the following estimated arrival ranges are possible: (10:10-11:10 am); (10:21-10:30 am); (10:41-10:50 am); (11:01-11:10 am); (11:21-11:30 am); (11:41-11:50 am).

Next, in this example, the eligibility module 210 checks for each estimated arrival range whether the beginning of the range is before the earliest user-specified delivery time (10:00 am) or whether the end of the range falls after the latest user-specified delivery time (11:30 am). In this example, only the last system-determined estimated arrival range falls after the user-specified delivery time. Since the last system-determined range falls after the user-specified delivery time, the eligibility module 210 in this example determines that the 11:23 bus is not a valid bus from which the drone can deliver the package. Since the eligibility module 210 determines, in this example, that there are five valid buses from which a drone can deliver a package, the communication module 250 accepts the drone delivery request.

In some embodiments, the user interface module 240 generates a user interface allowing a user to choose the best delivery window based on, for example, the estimated arrival ranges determined by the eligibility module 210. Conversely, the communication module 250 rejects the user's request for drone delivery when the eligibility module 210 determines there are no vehicles from which the drone can deliver the package within the requested window, and depending on the embodiment, the user interface module 240 generates a user interface prompting the user to input a new delivery window or select a valid delivery window.

In some embodiments of operation 530, the eligibility module 210 determines drone delivery eligibility based on the user's address. Accordingly, the delivery system 150 accesses a database (e.g., within database(s) 126) of mapped valid drone delivery zones and determines, based on the address, whether the location is within a valid delivery zone or not. Alternatively, the delivery system 150 computes or calculates the distance between the specified location and all, or some, of the drone delivery public transportation terminal locations to find a minimum distance, or nearly minimum distance, between the specified location and any drone delivery terminal (e.g., bus stop, train depot). In these embodiments, if the minimum distance is shorter than a predetermined threshold distance, the delivery system 150 determines satisfaction of the drone delivery eligibility based on the delivery address. In some embodiments, the delivery system 150 determines whether drone delivery is barred or restricted from delivering to a particular geolocation, based on the specified address being within a "no-fly zone." For example, based on regulations or safety concerns, such zones may include airspace near airports or schools. These "no-fly zones" can be stored within the database (e.g., within database(s) 126) of mapped valid drone delivery zones, or the eligibility module 210 calculates the distance between the specified delivery location and points designated as "no-fly zones" within the delivery system 150. The delivery system 150 rejects the user's request for drone delivery if it is determined that the specified delivery location is within a no-fly zone. In some embodiments, the delivery system 150 prompts the user to enter a new delivery location if the user would like delivery by drone, and this prompt is shown along with a message stating why the original location was rejected (e.g., "This location is in a no-fly zone."; "This location is too far from a terminal which supports drone delivery."). The prompt is generated and displayed to the user by user interface module 240.

Figure 6:
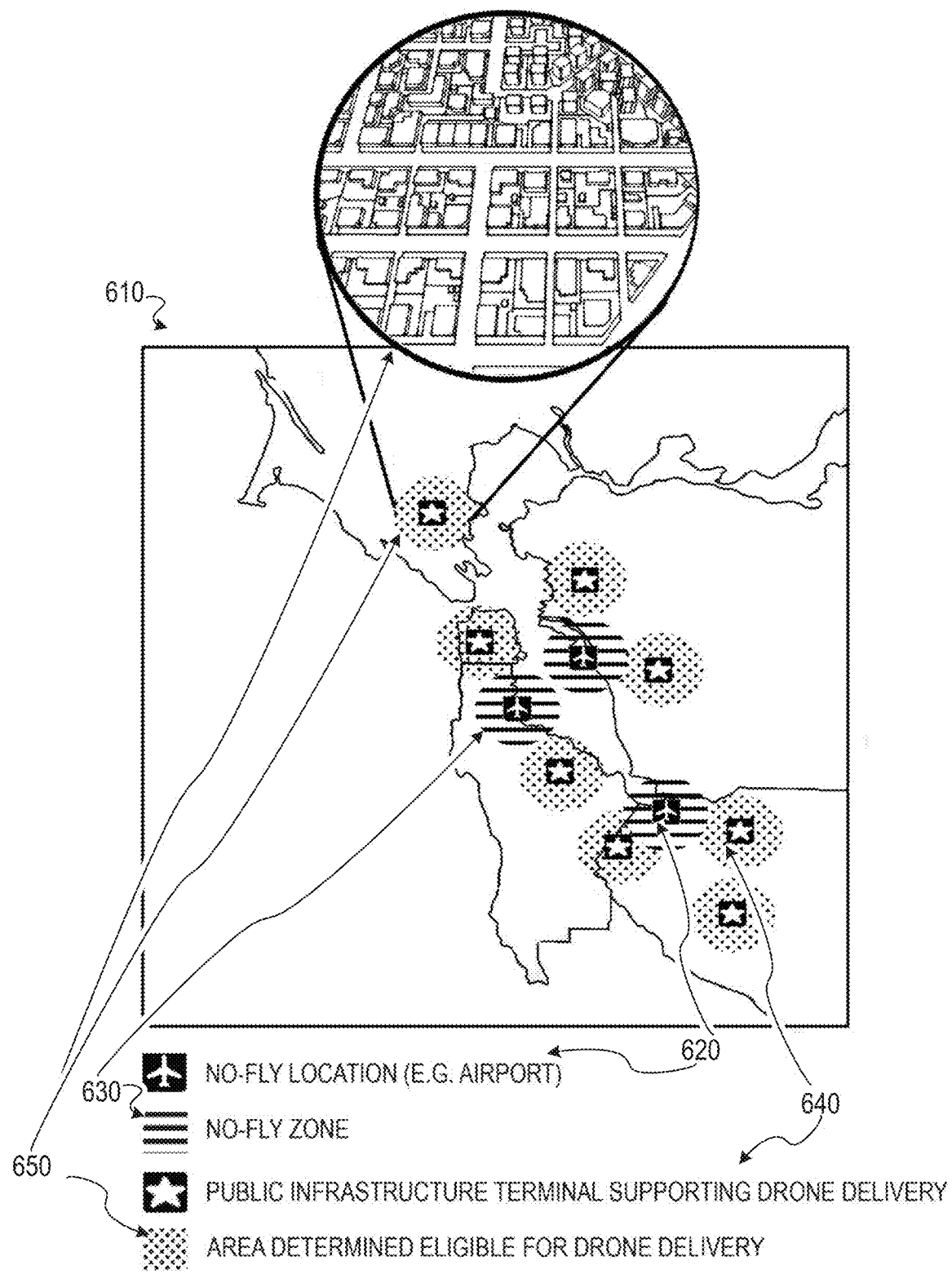
FIG. 6 is a diagram illustrating an example, on a map, of zones eligible for drone delivery and zones where drone delivery is prohibited, according to some example embodiments.

FIG. 6 illustrates a map of areas determined eligible for drone delivery. In a specific example, a map 610 of the San Francisco Bay Area is shown with overlaid no-fly zones 630 surrounding no-fly locations 620 (such as airports). The map 610 is also overlaid with areas determined eligible for drone delivery 650 that surround public infrastructure terminals supporting drone delivery 640 (e.g., bus stations, train depots). The eligibility module 210 uses map data such as the map 610 to determine drone delivery eligibility; for example, by determining whether the geolocation information of the user's specified drop-off destination is within an area determined eligible for drone delivery 650.

Figure 7:
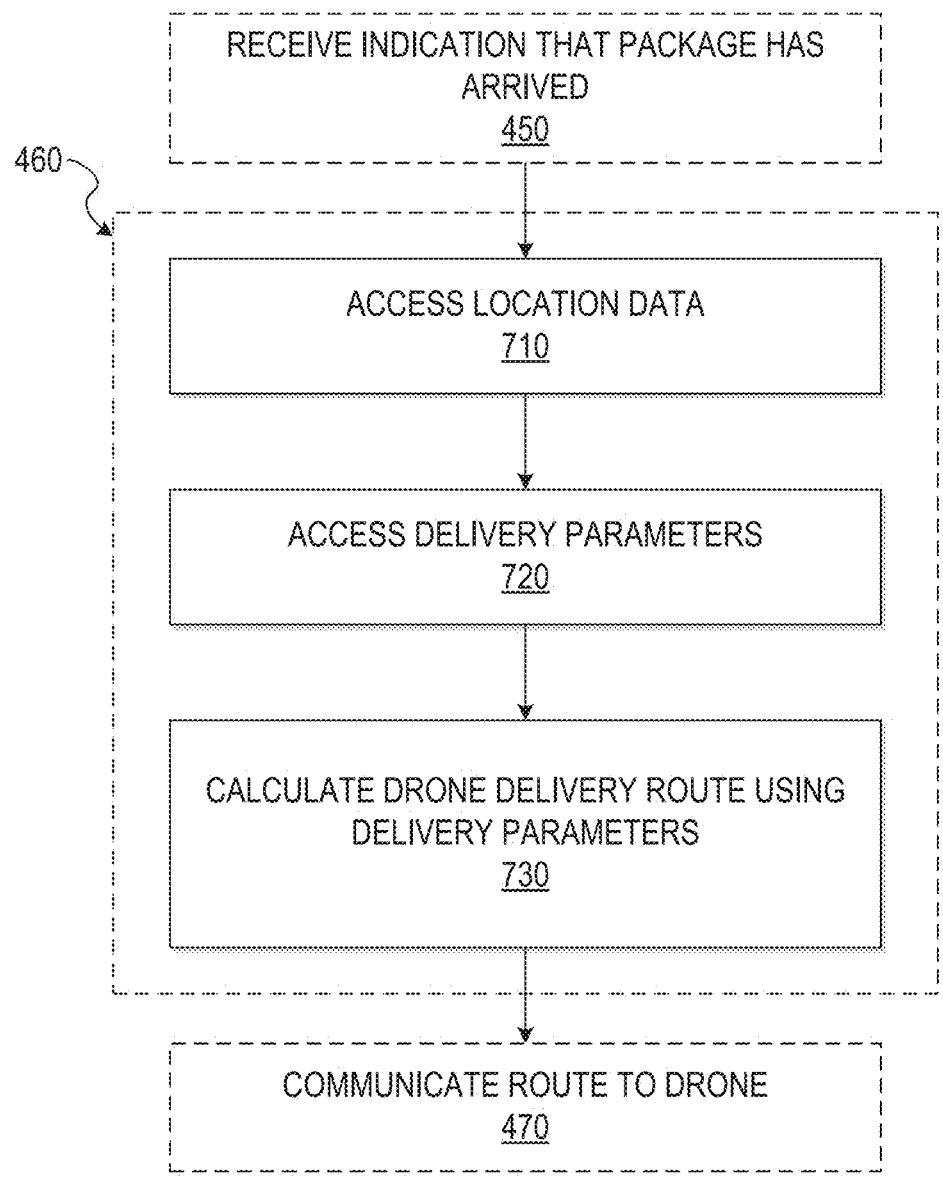
FIG. 7 is a flow diagram illustrating an example method for determining a drone delivery route, according to some example embodiments.

FIG. 7 is a flow diagram illustrating further example operations of operation 460, discussed above, for determining the drone delivery route. In an example embodiment, operation 460 includes the additional operations of FIG. 7.

Subsequent to receiving the indication that the package has arrived at the identified public infrastructure terminal at operation 450, at operation 710, the data module 220 accesses location data. In various embodiments, the location data is stored, for example, within database(s) 126 and accessed using the data module 220. The location data includes geolocation of the drop-off destination and geolocation data of the public infrastructure terminal identified at operation 430 discussed above in connection with FIG. 4. The location data also includes geolocation information of possible drop-off destination coordinates and acceptable delivery routes within a predetermined area around each public infrastructure terminal supporting drone delivery (e.g. a pre-determined radius of the public infrastructure terminal). In some embodiments, the delivery route module 270 determines the drone delivery route according to the route database, wherein the drone delivery route is an acceptable delivery route with a shortest path from the identified public infrastructure terminal to the drop-off destination. Alternatively, location data is stored within the third party server(s) 130 and accessed through a third party application 132 (e.g., GOOGLE MAPS®, APPLE MAPS®) to provide accurate location data to delivery system 150.

At operation 720, the data module 220 accesses delivery parameters. The delivery parameters are stored, for example, within database(s) 126, and are used by the delivery route module 270 which is in network communication with the data module 220. In various embodiments, the delivery parameters include a shortest or near-shortest distance from the public infrastructure terminal identified at operation 430 to the user-specified drop-off destination, a shortest or near-shortest transit time from the package origin to the drop-off destination, or a number of packages being marked for delivery to the identified public infrastructure terminal. In some embodiments, the delivery parameters have a pre-determined weight which is used when the delivery route module 270 determines the drone delivery route (e.g., the shortest distance from the terminal to the drop-off destination is given the most weight to minimize each drone's flight time and prevent battery drain). In other embodiments, user interface module 240 generates a user interface allowing for user input to specify the delivery parameters that are given more weight (e.g., if a user selects an option for expedited delivery, the delivery parameter of shortest or near-shortest transit time from the package origin to the drop-off destination is given more weight).

At operation 730, the delivery route module 270 calculates the drone delivery route using the delivery parameters accessed in operation 720. In embodiments where the geolocation data is stored as vector data, the drone delivery route is calculated as a vector starting at a terminal and ending at the drop-off destination, where the vector is limited to airspace identified as valid airspace. This vector may be defined in three-dimensions (e.g., as a 3-D plot representing a latitude, a longitude, and an altitude). In some embodiments, valid airspace is limited to airspace above public areas including streets and sidewalks, so drone delivery routes are confined to airspace above these public areas.

Figure 8:
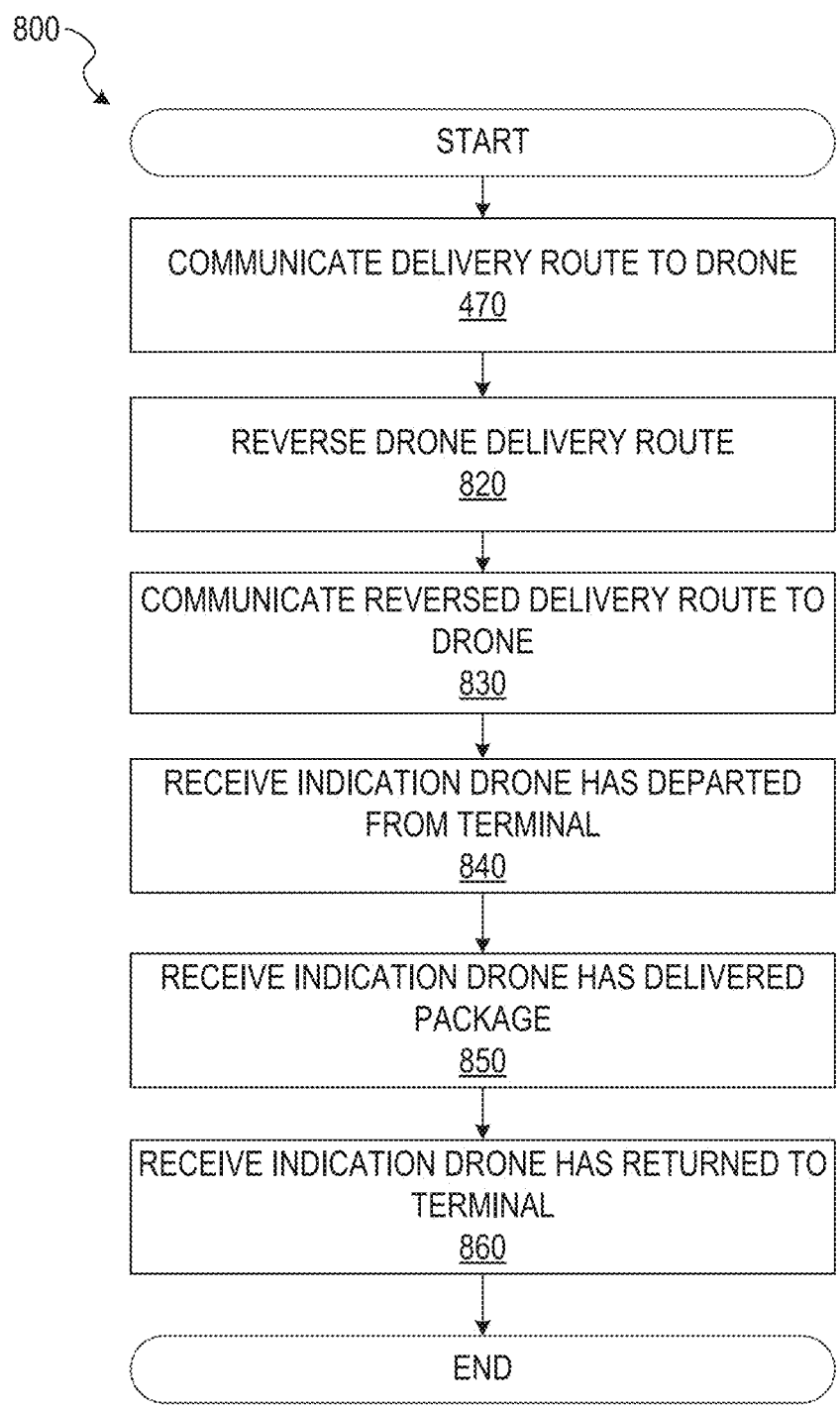
FIG. 8 is a flow diagram illustrating an example method for determining a return route for a drone to return to a public transportation infrastructure terminal once a drone has delivered a package, according to some example embodiments.

FIG. 8 is a flow diagram depicting an example method 800 by which the drone returns to the terminal from which the drone departed after the package is delivered at the drop-off destination. The operations of the method 800 can be performed by components of the delivery system 150, and are so described below for the purposes of illustration.

At operation 470, the communication module 250 communicates the delivery route to the drone. For example, the communication module 250 communicates the delivery route to the drone through a wireless connection such as BLUETOOTH®, WI-FI®, or a cellular network (e.g., 2G, 3G, 4G, LTE, and WiMax). Alternatively, the communication module 250 communicates some, or all, of the directions to the drones through a wired connection (e.g., Ethernet, coaxial cables).). In these embodiments, the wired communication can occur when drones are docked for charging at vehicles or terminals.

At operation 820, the delivery route module 270 reverses the drone delivery route. In an embodiment where the geolocation data is stored as a vector map, the vector representing the drone delivery route is simply reversed in direction, in order to create a reversed drone delivery route with the same endpoints as the drone delivery route.

At operation 830, the reversed delivery route is communicated to the drone. For example, the communication module 250 communicates the reversed delivery route to the drone through a wireless connection to the network 104 such as BLUETOOTH®, WI-FI®, or a cellular network (e.g., 2G, 3G, 4G, LTE, WiMax), or a wired connection (e.g., Ethernet, coaxial cables).

At operation 840, the communication module 250 receives an indication that the drone has departed from the terminal. In embodiments including a database of drones with an associated event log for each drone, the drone or the vehicle transmits an indication to the delivery system 150 that the drone has left the terminal, which is recorded in the event log associated with the drone. The indication is received by the communication module 250. In some embodiments, the database containing drone data also includes a current location of each drone, and the current location of each drone is updated by the data module 220 at a pre-determined time interval.

At operation 850, the notification module 260 receives an indication that the drone has delivered the package. In embodiments, including a package database within database(s) 126 that contains package data including event logs for each package, the event log for a package is updated to show that the drone has delivered the package.

In some embodiments, if delivery is unsuccessful (e.g., if the user was not at home or otherwise refused the package), the drone returns to the terminal with the package. The package is then stored at the terminal for later drop-off by a drone or, alternatively, brought back to the package origin by a drone or a vehicle.

In various embodiments, once the drone drops off the package, the drone returns along the reversed delivery route to a first terminal from which the drone departed. Alternatively, the drone travels to a second terminal along a predetermined route.

At operation 860, once the drone returns to the first terminal or the second terminal, the communication module 250 receives an indication that the drone has returned to the terminal. In some embodiments, the indication that the drone has returned to the terminal (discussed above in connection with operation 860) is in response to physically detecting a physical identifier located on or within the drone, or a signal associated with the drone, within the vicinity of the terminal. For example, when the drone returns to the terminal, the terminal may detect this through GPS data, WI-FI® triangulation, scanning a QR code, RFID tag detection, or Near Field Communication (NFC) that the drone has returned, and send an indication to the communication module 250 that the drone has returned to the terminal.

In an example of a delivery system 150 implemented via the "emergent" (i.e., "bottom-up") architecture, drones depart from vehicles to deliver packages and return to vehicles after delivering packages. In such an embodiment, the geolocation module 230 identifies a first public infrastructure vehicle from which a drone begins delivery, and the delivery route module 270 determines a delivery route from the first vehicle to the drop-off destination. Once the notification module 260 receives an indication that the drone has delivered the package at operation 850, the delivery route module 270 determines a drone return route from the drop-off destination to a second public infrastructure vehicle. In some embodiments, drones travel from vehicle to vehicle creating an emergent network with a city-wide distribution of drones, rather than concentrating drone delivery around terminals. In some embodiments, drones return to a non-mobile location when they need to be repaired (e.g., through a drone return route calculated by delivery route module 270, or by returning to a vehicle which takes the drone to a repair shop).

FIG. 9A is a diagram illustrating an example of a drone delivery route 920 determined by the delivery route module 270 (discussed above in connection with operation 460 of FIG. 4). In FIG. 9A, at location 910 a vehicle is shown dropping off drones and packages at the public transportation infrastructure terminal identified by the geolocation module 230. The drone travels along the drone delivery route 920 (depicted by a solid line) in order to drop off one or more packages. The drone delivery route 920 is determined by the delivery route module 270 based on, for example, public infrastructure information 912 including route locations 914, terminal locations 916, and geolocation data 918 (e.g., geolocation of possible drop-off destinations within an area near the terminal). In some example embodiments, the database(s) 126 includes current location of a plurality of drones utilized by the delivery system 150. The drone location database, in some examples, is used by the user interface module 240 to create a user interface showing a user a current geolocation of the drone performing delivery of the package once the drone leaves the terminal to drop off the package.

At location 930, the drone reaches the drop-off destination and drops off the package. In various embodiments, the delivery system 150 requests user approval before dropping off the package; for example, the user interface module 240 generates a user interface on the client device 110 (e.g., a smartphone, wearable device, or personal computer) requesting the user's signature or another form of user identification (e.g., biometric identification such as fingerprint or retina recognition) in order to confirm the package delivery.

In FIG. 9A, dashed line 940 depicts an example drone return route. The example drone return route is the reversed drone delivery route communicated to the drone in operation 830 of FIG. 8. Alternatively, the delivery route module 270 determines a different drone return route from the drop-off destination to the terminal that is not the reversed drone delivery route, and the communication module 250 communicates, to the drone, an instruction to return to the identified public infrastructure terminal using the different drone return route.

In yet other embodiments, the drone carries multiple packages for delivery and the delivery route module 270 calculates a route from a first drop-off destination to a second drop-off destination once a first package has been delivered from the first drop-off destination. Further still, the delivery route module 270 then calculates a route from the second drop-off destination to a third drop-off destination. Once the drone has delivered all of the packages, the delivery route module 270 determines a return route from the most recent drop-off destination to the terminal from which the drone departed at location 910.

Figure 9B:
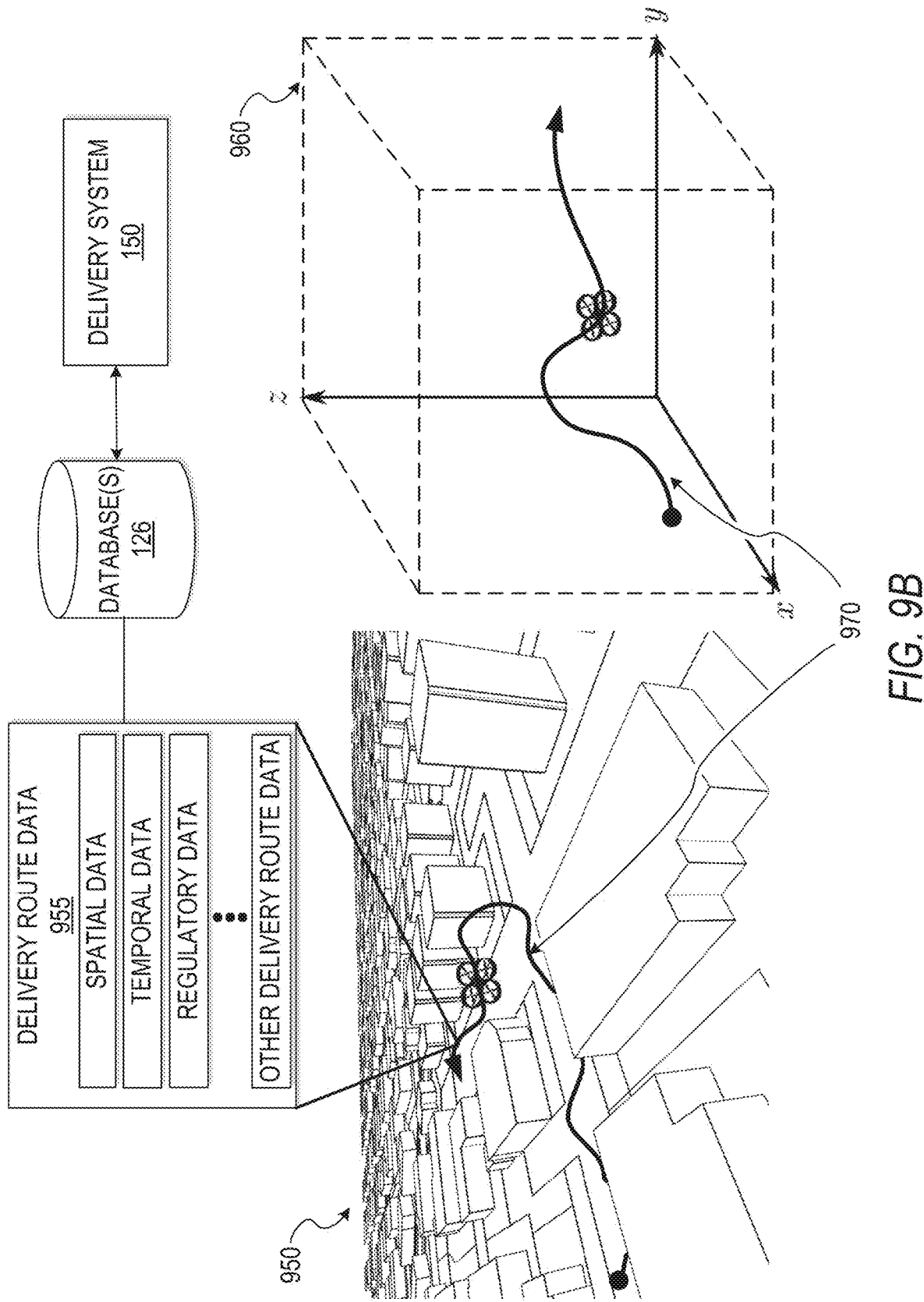
FIG. 9B is a diagram illustrating an example three-dimensional drone delivery route within a city, and as a vector within Cartesian coordinates, according to some example embodiments.

FIG. 9B is a diagram illustrating an example of a three-dimensional view of drone delivery route 970 determined in operation 460 of FIG. 4. In region 950, the delivery route 970 is a three-dimensional vector defined by delivery route data 955. The delivery route data 955 is stored, for example, within database(s) 126, and is accessed by the delivery system 150. In various embodiments, the delivery route module 270 outputs delivery route data 955 once the delivery route module 270 determines a drone delivery route. The delivery route data 955 comprises one or more of: spatial data (e.g., latitude, longitude, and altitude), temporal data, regulatory data (e.g., lawful airspace), and route endpoint data. In Cartesian space 960, the delivery route 970 is displayed as a vector in three-dimensional space. In embodiments where the delivery route 970 is stored as a vector comprised of points of the delivery route data 955, the delivery route vector is simply reversed in direction in operation 820 of FIG. 8 and the reversed delivery route 970 is communicated to the drone in operation 830.

Figure 10:
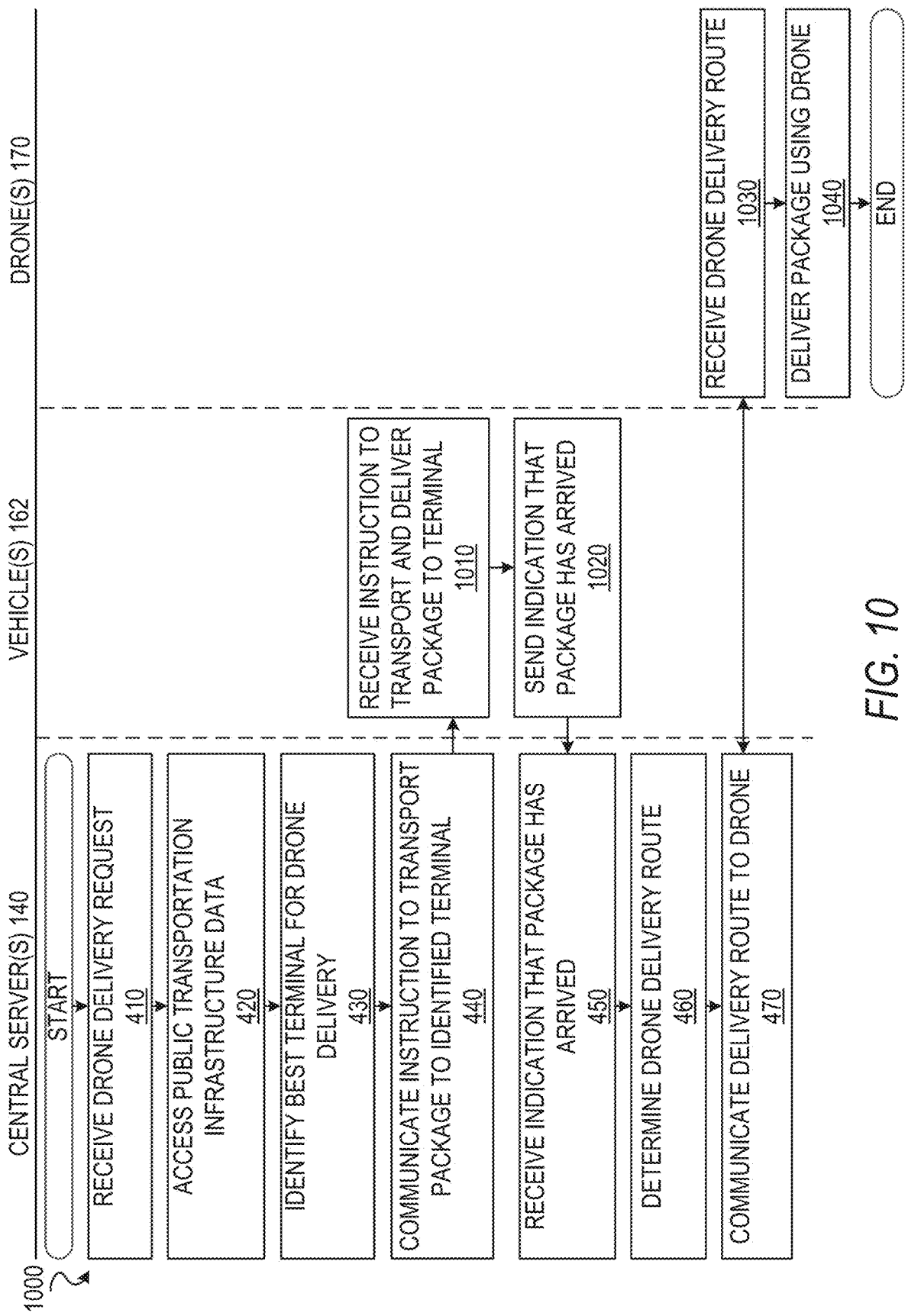
FIG. 10 is a swim-lane diagram illustrating an example drone-assisted, public transportation assisted delivery system facilitated by central server(s), vehicle(s), and drone(s), according to some example embodiments.

To illustrate the interactions between communicatively coupled components of the delivery system 150, FIG. 10 is a swim-lane diagram 1000 showing example operations at various components. At operation 410 which is also described in FIG. 4, the server(s) 140 (e.g., application server(s) 140) receive the request for drone delivery. At operation 420, the server(s) 140 access public infrastructure information stored within database(s) 126 and accessed by data module 220. At operation 430, the server(s) 140 identify the terminal from which the drone(s) 170 will depart. In various embodiments, operation 430 is carried out by the geolocation module 230 based on the public infrastructure information accessed by data module 220 in operation 420. At operation 440, the server(s) 140 communicate an instruction to transport the package to the identified terminal. In example embodiments, the communication module 250 communicates this instruction to vehicle(s) 162.

At operation 1010 of the example diagram 1000, the vehicle(s) 162 receive the instruction to transport and deliver the package to the terminal communicated by the communication module 250 in operation 440. At operation 1020, once the package arrives at the terminal identified at operation 430, the vehicle(s) 162 send an indication to server(s) 140 that the package has arrived at the identified terminal. In embodiments where package data is stored in a package database within database(s) 126, an event log within the package database is updated to show that the package has arrived at the terminal.

At operation 450 which is also described in FIG. 4, the server(s) 140 receive the indication that the package has arrived at the terminal, sent by vehicle(s) 162 in operation 1020. The server(s) 140 determine a drone delivery route in operation 460 and communicate the delivery route to the drone(s) 170 in operation 470. In various embodiments, the communication module 250 receives the indication that the package has arrived at the terminal.

Subsequent to server(s) 140 communicating a delivery route to the drone in operation 470, the drone(s) 170 receive the drone delivery route in operation 1030 in example embodiments. In embodiments where drone(s) 170 are equipped with navigation capabilities such as GPS or WI-FI® triangulation, the drone delivery route is received as a map vector. The drone(s) 170 travel along the drone delivery route and deliver the package in operation 1040. In some embodiments, the drone(s) 170 deliver the packages to the user's front door. For example, the drone(s) 170 may have optical sensing capabilities (e.g., equipped with a camera and image processing capabilities) to identify a door or a doorstop to deliver the package. In another example, the drone(s) 170 may deliver the packages to an apartment dweller's windowsill or balcony by scanning a QR code or other unique identifier placed on an item receptacle attached to the apartment dweller's windowsill or balcony. In yet another example, the drone(s) 170 may deliver the package directly to the user by traveling to an exact geolocation (e.g., through WI-FI® triangulation or GPS data) of the user's device, such as a smartphone or wearable device. In further examples, the drone(s) 170 deliver packages to rooftops, backyards, personal vehicles, and package repositories using one or more of: optical recognition, NFC, BLUETOOTH®, or GPS data.

Figure 11:
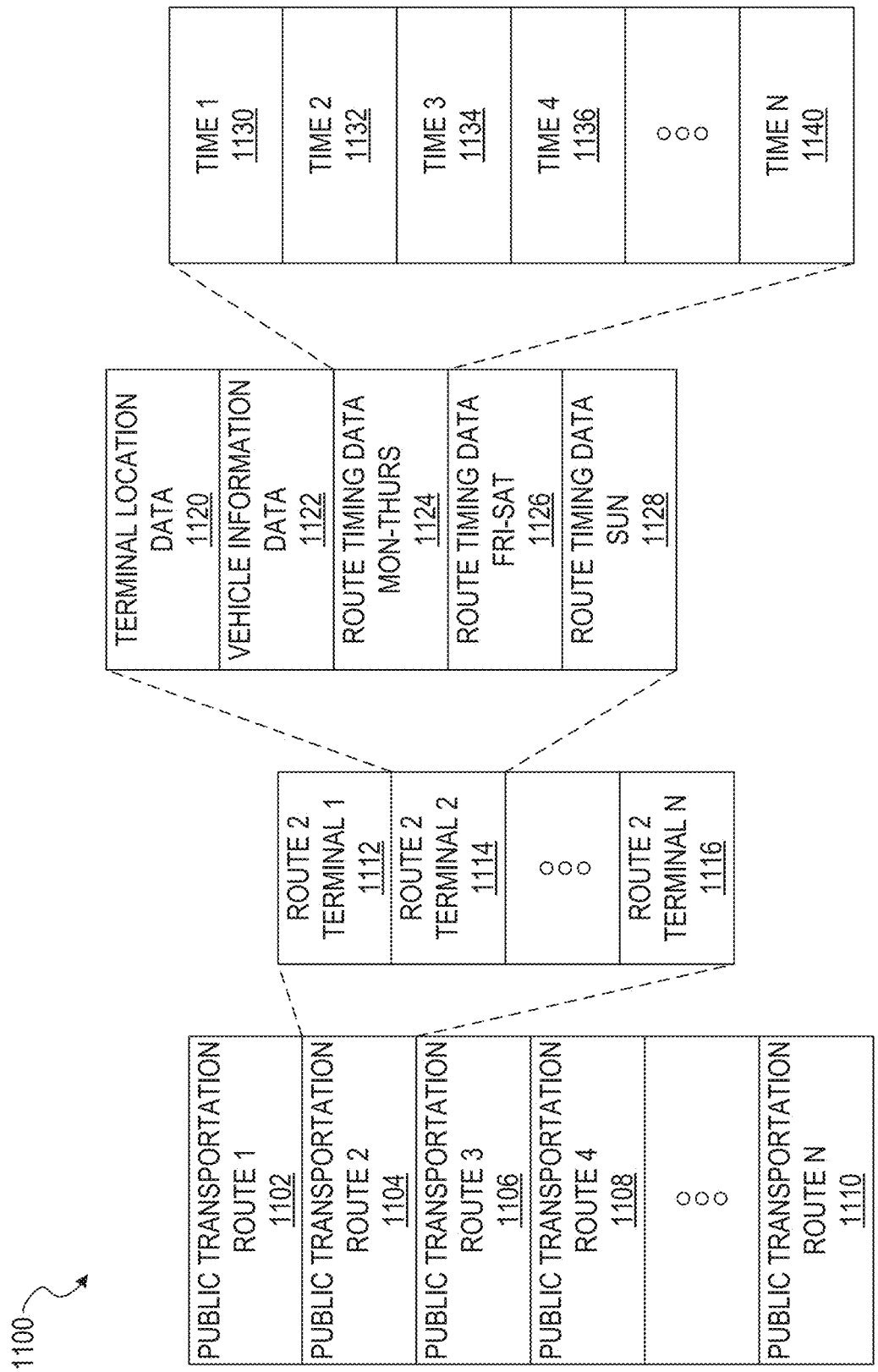
FIG. 11 is a data structure diagram illustrating an exemplary method of storing information about public transportation routes and terminals, according to some example embodiments.

FIG. 11 is an example data hierarchy which shows how public infrastructure information is stored within database(s) 126. In the data hierarchy 1100, public transportation route 1 1102, public transportation route 2 1104, public transportation route 3 1106, public transportation route 4 1108, up to public transportation route N 1110 contain data associated with various public transportation routes. Information about various terminals is stored within the element 1104 representing public transportation route 2. In the data hierarchy

1100, element 1104 contains information about route 2 terminal 1 1112, route 2 terminal 2 1114, up to route 2 terminal N 1116.

Furthermore, within the element representing route 2 terminal 2 1114, various information is stored including terminal location data 1120, vehicle information data 1122, route timing data (Monday-Thursday) 1124, route timing data (Friday-Saturday) 1126, and route timing data (Sunday) 1128. Within route timing data (Monday-Thursday) 1124 for route 2, terminal 2, elements 1130, 1132, 1134, 1136, . . . 1140 represent times 1, 2, 3, 4, . . . N, respectively. Data can be effectively grouped for the geolocation module 230 or the delivery route module 270, for example, to determine geolocations and drone delivery routes.

In various embodiments, terminal location data 1120 includes one or more of two-dimensional geolocation coordinates (e.g., a longitude and a latitude), three-dimensional geolocation coordinates (e.g., a longitude, a latitude, and an altitude), vector data representing distances between terminal locations, or raster data representing terminal locations. In some embodiments, vehicle information data 1122 includes one or more of: unique vehicle identifier to track vehicles that are active or inactive, vehicle activity, precise vehicle location (e.g., updated at a predetermined time interval), number of packages currently on the vehicle, package capacity, drone capacity, or number of drones currently on the vehicle.

FIGS. 12-17 depict example user interfaces for interactively presenting information to the user. Although FIGS. 12-17 depict specific example user interfaces and user interface elements, these are merely non-limiting examples; many other alternate user interfaces and user interface elements can be generated by the user interface module 240 and caused to be presented to the user. It will be noted that alternate presentations of the displays of FIGS. 12-17 can include additional information, graphics, options, and so forth. Alternatively, other presentations can include less information, or provide abridged information for easy use by the user.

Figure 12:
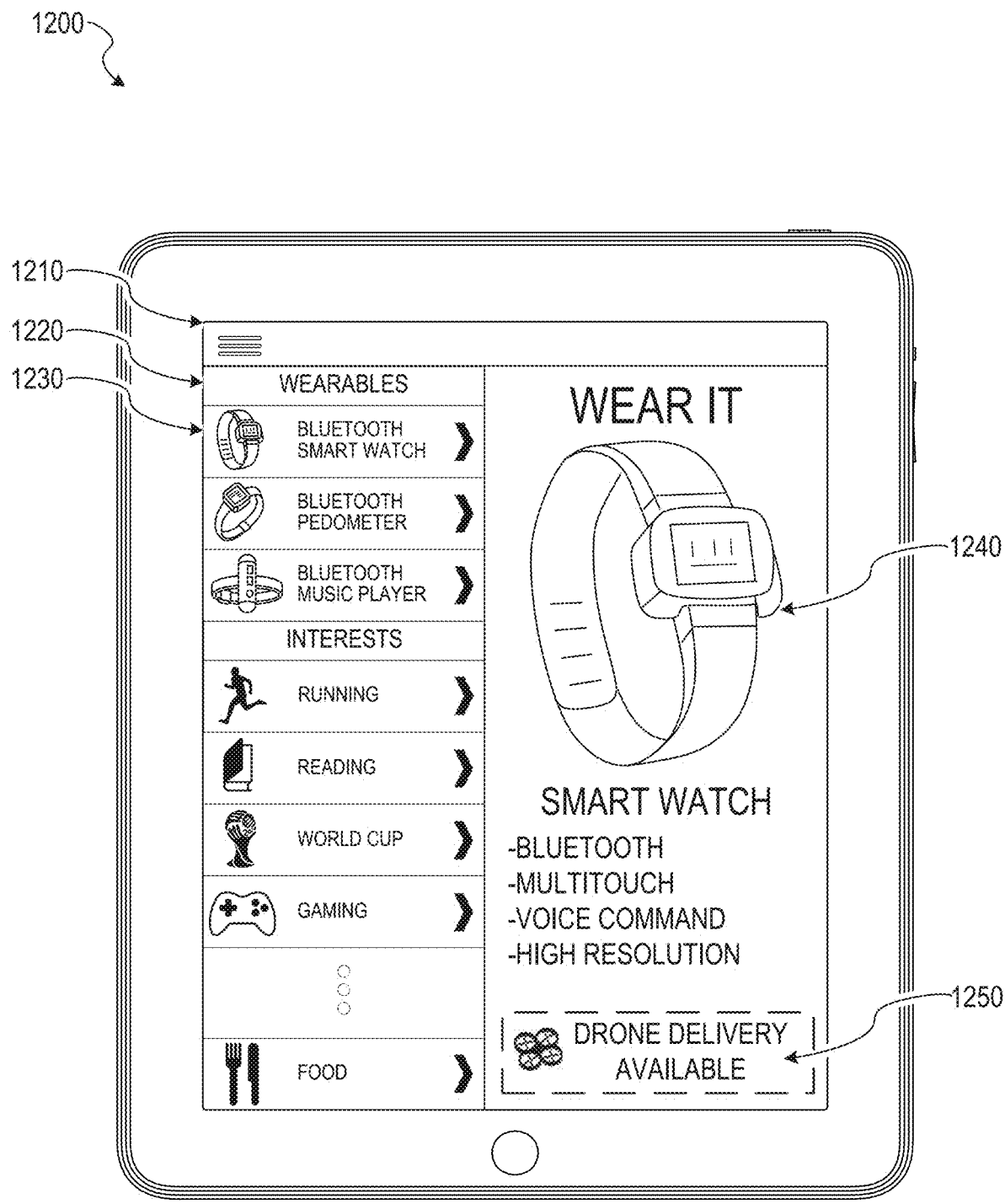
FIGS. 12-17 are user interface diagrams depicting various example user interfaces, according to some example embodiments.

FIG. 12 depicts an example device 1200 (e.g., a smart phone or tablet computer) displaying an example user interface 1210 that includes an item category header 1220, an item category 1230, and an item listing 1240, according to some example embodiments. In some implementations, the content depicted within user interface 1210 includes third party content provided by a third party. In an example embodiment, the item category 1230 comprises a grouping of similar item listings 1240. In various embodiments, the item listing 1240 contains a graphic indication 1250 showing that drone delivery is available for the item. In some embodiments, the graphic indication 1250 is only displayed if an item has been determined eligible for drone delivery based on item attributes. The drone delivery eligibility data may be accessed by data module 220 in operation 520. Alternative interactive presentations of the item listing 1240 may include additional information, graphics, media, options, and so on while other presentations include less information.

Figure 13:
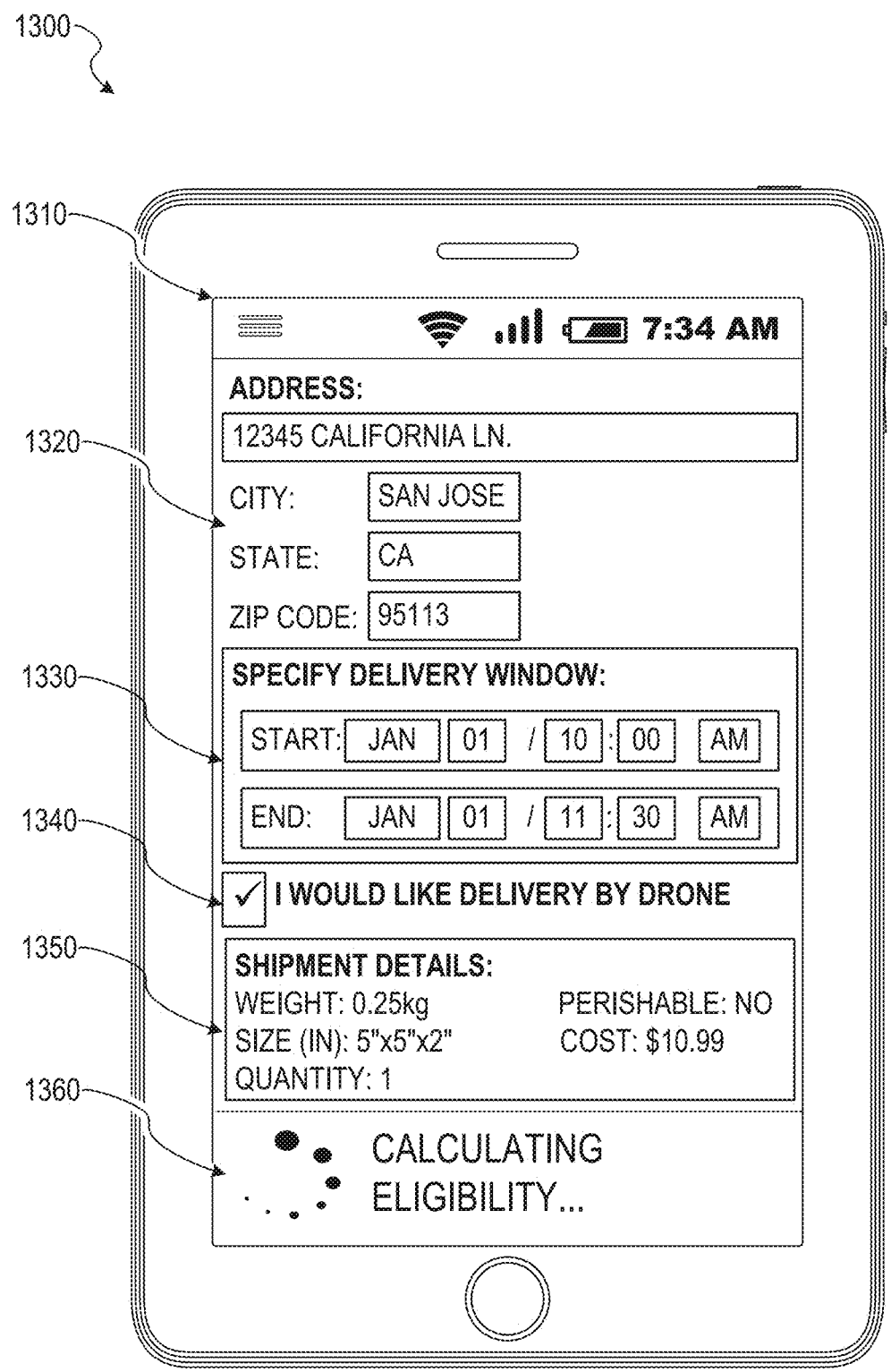

FIG. 13 depicts an example device 1300 (e.g., a smart phone) displaying an example user interface 1310 generated by user interface module 240 for a user to request drone delivery. In some implementations, the user interface 1310 contains drop-off destination geolocation information form 1320, specified delivery time form 1330, drone delivery request field 1340, item attributes 1350, and eligibility indicator 1360. In an example embodiment, the drop-off destination geolocation information form 1320 prompts the user to specify geolocation information of the requested drop-off destination, including a street address, PO box number, city, state, country, and zip code data. In an example embodiment, the specified delivery time form 1330 prompts the user to input a desired delivery time. In various embodiments, specified delivery time form 1330 requests one or more of: a range of delivery times, a range of delivery dates, one delivery time, or one delivery date.

In an example embodiment, drone delivery request field 1340 allows the user to request delivery by drone. In further examples, item attributes 1350 include attributes that determine an item's eligibility for drone delivery, such as item weight, dimensions, quantity, perishability, fragility, and cost. In some example embodiments, eligibility indicator 1360 is generated by the user interface module 240 to alert the user regarding whether the item is eligible for drone delivery. For example, if the eligibility module 210 is determining eligibility as in operation 530, an animation appears next to the text "CALCULATING ELIGIBILITY." In another example, if the eligibility module 210 determines the item is ineligible for drone delivery, the eligibility indicator 1360 may appear as a red "X" next to the text "NOT ELIGIBLE" and, in some embodiments, a reason for ineligibility such as "ADDRESS IS OUTSIDE OF DRONE DELIVERY RANGE."

Figure 14:
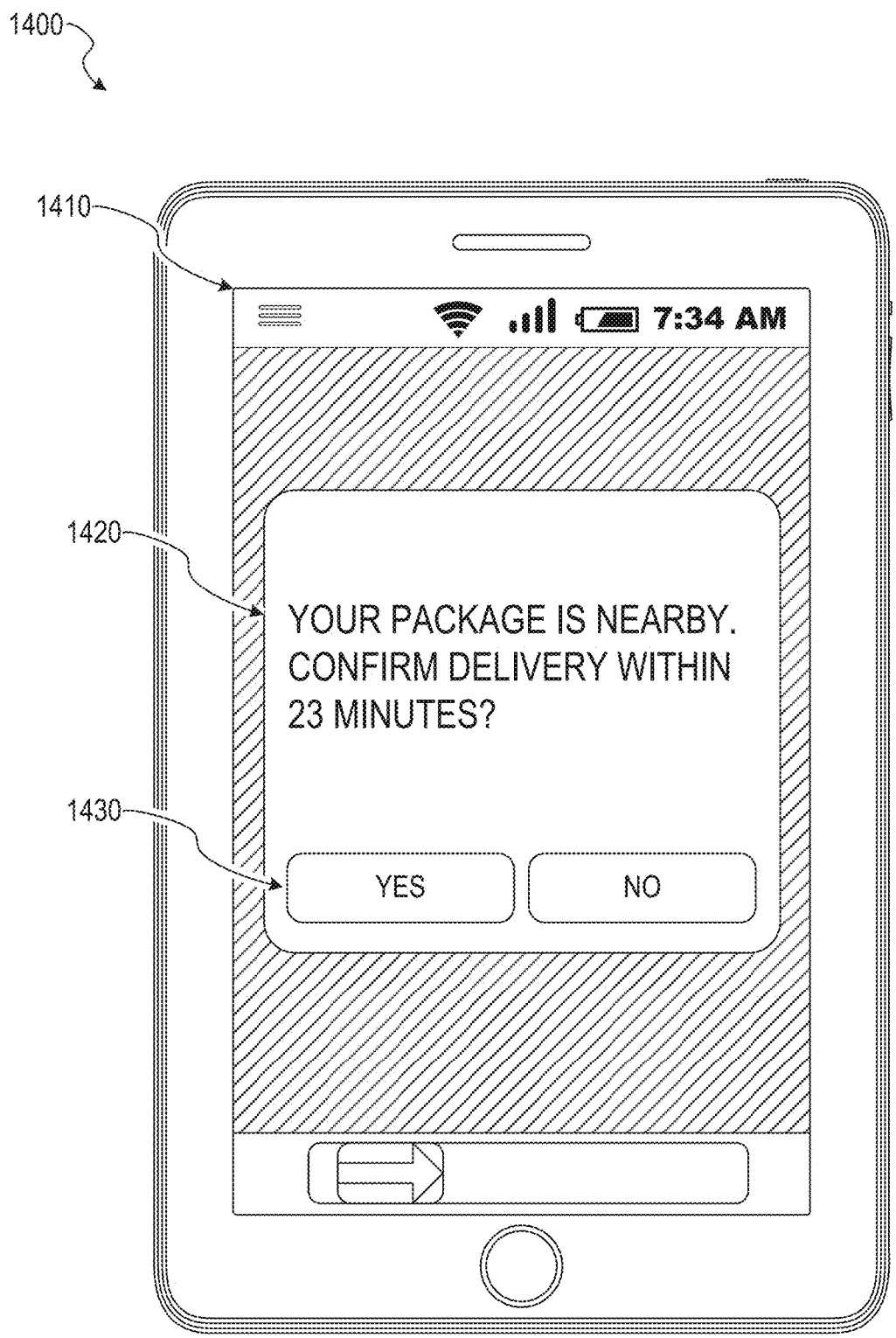

FIG. 14 depicts an example device 1400 (e.g., a smart phone) displaying a user interface 1410 generated by user interface module 240 for a user to confirm delivery of an item before a drone delivers the item from the terminal to the drop-off destination in operation 1040. In various embodiments, notification 1420 alerts the user that the package is nearby and user input elements 1430 receive user input to confirm or reject delivery. For example, the notification 1420 is generated if a user selects an option for the delivery system 150 to notify the user before dropping off an item. Alternatively, notification 1420 may automatically be generated by user interface module 240 if the price of the item is above a threshold price (e.g., more than $75.00). In some embodiments, the delivery system 150 will communicate, through the communication module 250, an instruction for the drone not to deliver the package if the user presses "NO" on user input elements 1430.

Figure 15:
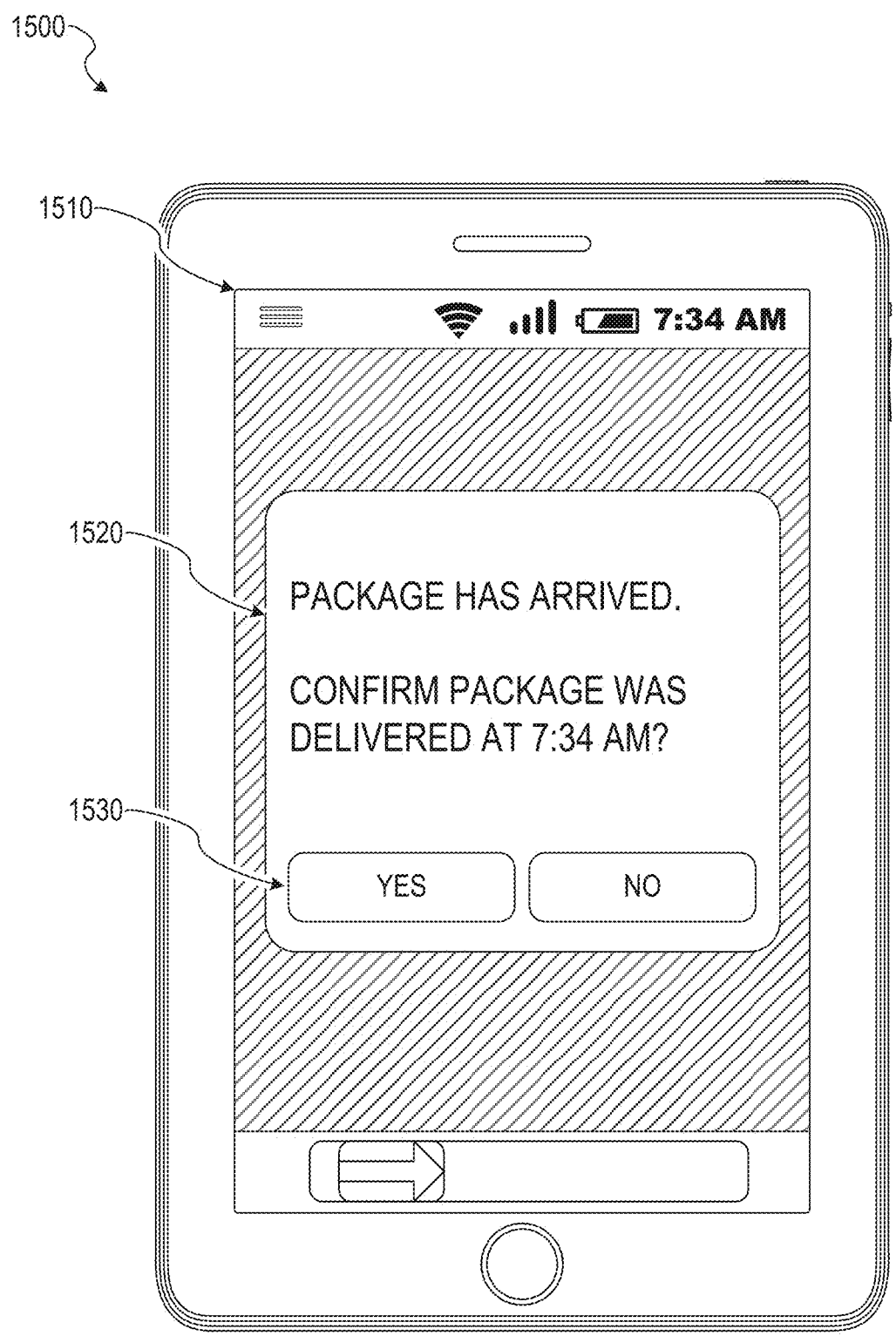

FIG. 15 depicts an example device 1500 (e.g., a smart phone) displaying a user interface 1510 generated by user interface module 240 for a user to confirm delivery of an item when a drone delivers the item from the terminal to the drop-off destination in operation 1040. In various embodiments, notification 1520 alerts the user that the package has arrived and user input elements 1530 receive user input to accept the package. Even if the drone has arrived at the drop-off destination, the drone may not release the item for delivery unless the user confirms delivery on user input elements 1530.

Figure 16:
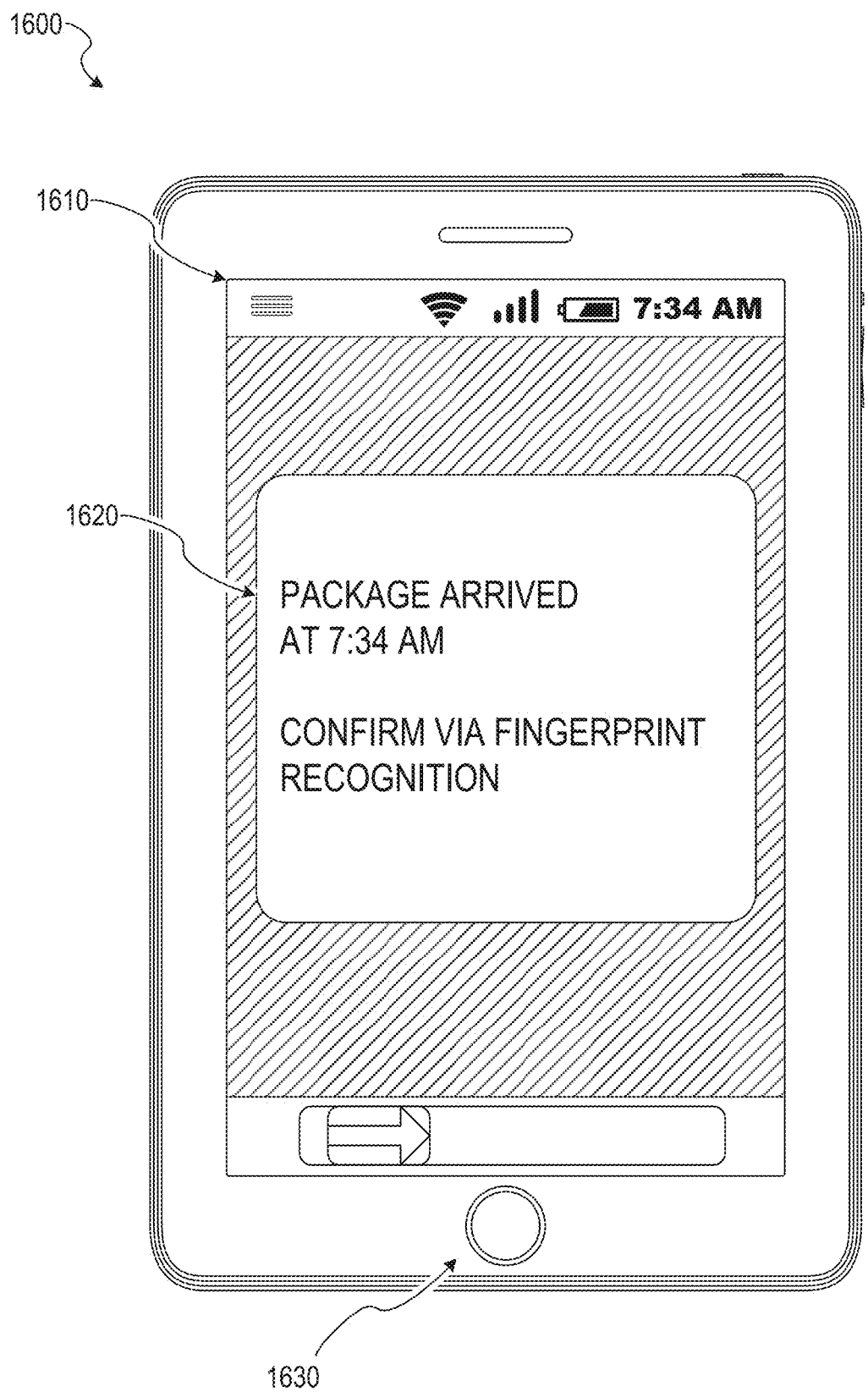

FIG. 16 depicts an example device 1600 (e.g., a smart phone) displaying a user interface 1610 generated by user interface module 240 for a user to confirm delivery of an item through biometric identifiers when a drone delivers the item from the terminal to the drop-off destination in operation 1040. In various embodiments, notification 1620 alerts the user that the package has arrived and biometric sensor 1630 (e.g., thumbprint sensor, retina sensor, heartbeat analyzer, or ear identifier) receives acceptance of the package through the user's biometric identifier. Even if the drone has arrived at the drop-off destination, the drone may not release the item for delivery unless the user confirms delivery on biometric sensor 1630. In some embodiments, a non-biometric user identifier is used to confirm package delivery (e.g., a signature or a NFC-enabled credit card).

Figure 17:
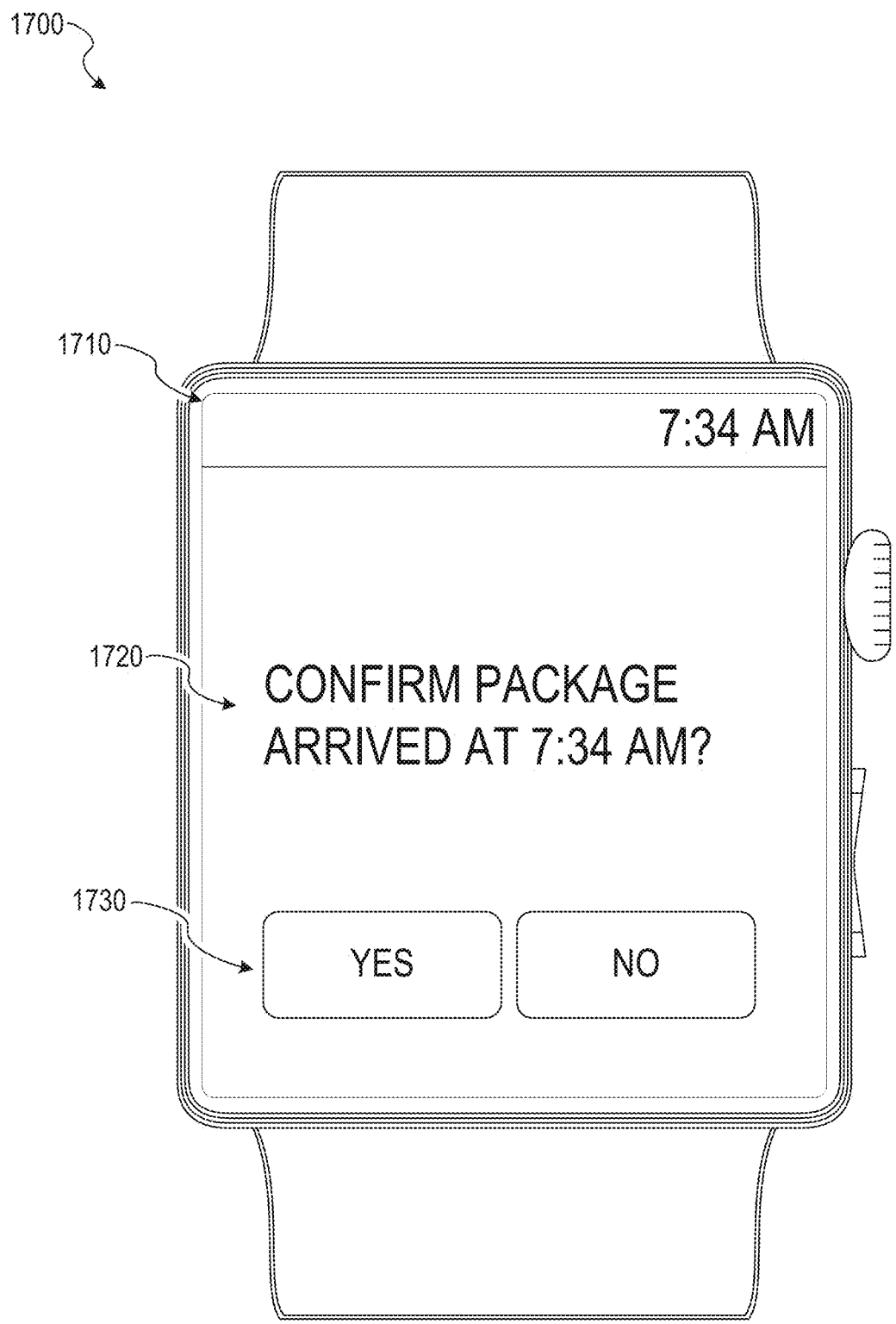

FIG. 17 depicts an example wearable device 1700 (e.g., a smartwatch) displaying a user interface 1710 generated by user interface module 240 for a user to confirm delivery of an item when a drone delivers the item from the terminal to the drop-off destination in operation 1040. In various embodiments, notification 1720 alerts the user that the package has arrived and user input elements 1730 receive user input through the wearable device 1700 to accept the package. Even if the drone has arrived at the drop-off destination, the drone may not release the item for delivery unless the user confirms delivery on user input elements 1730.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-19 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 18:
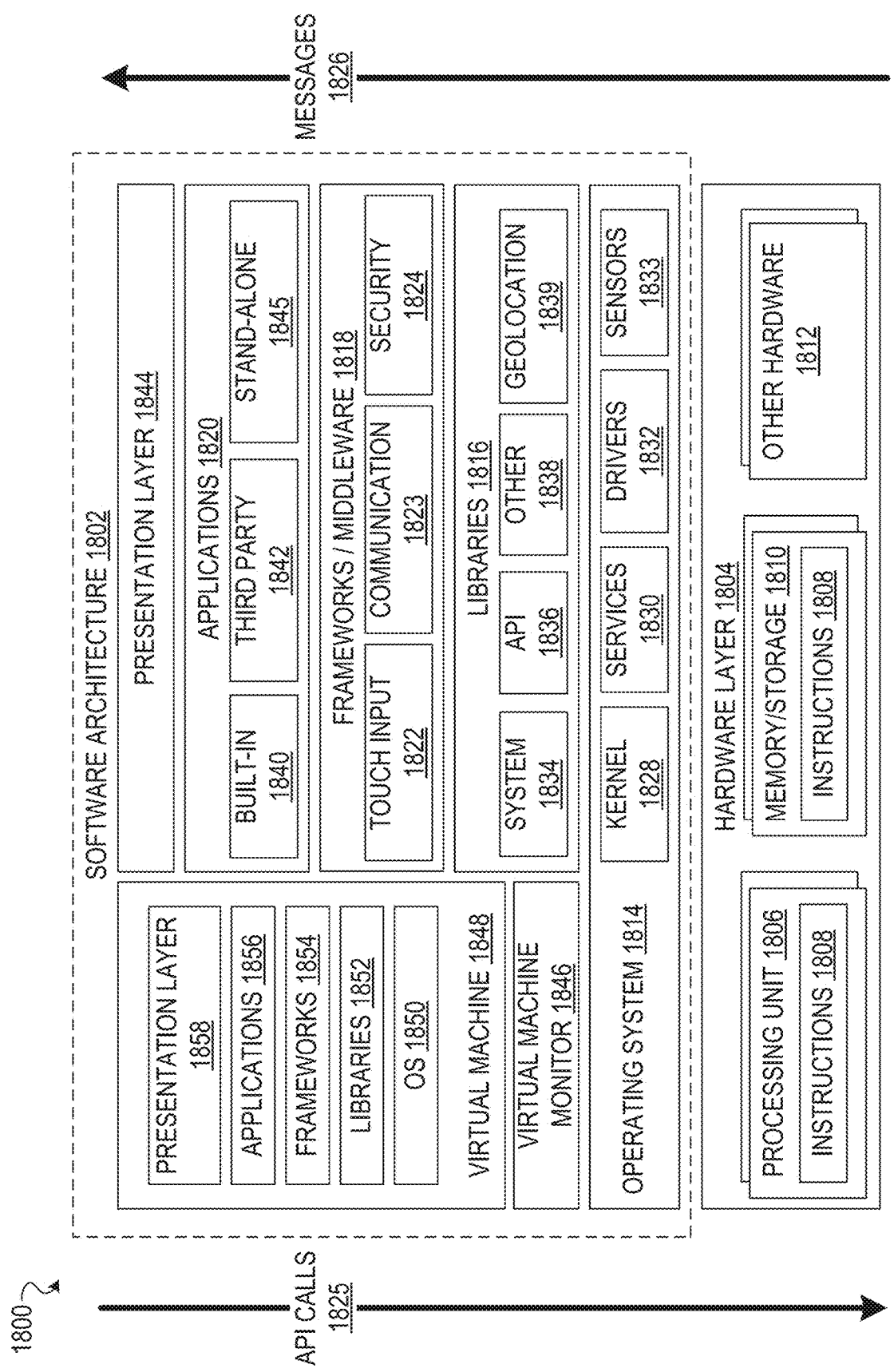
FIG. 18 is a block diagram illustrating an example of a software architecture that may be installed on a machine, according to some example embodiments.

FIG. 18 is a block diagram 1800 illustrating a representative software architecture 1802, which may be used in conjunction with various hardware architectures herein described. FIG. 18 is merely a non-limiting example of a software architecture 1802 and it will be appreciated that many other architectures may be implemented to facilitate the functionality described herein. The software architecture 1802 may be executing on hardware such as machine 1900 of FIG. 19 that includes, among other things, processors 1910, memory/storage 1930, and I/O components 1950. A representative hardware layer 1804 is illustrated and can represent, for example, the machine 1900 of FIG. 19. The representative hardware layer 1804 comprises one or more processing units 1806 having associated executable instructions 1808. Executable instructions 1808 represent the executable instructions of the software architecture 1802, including implementation of the methods, modules and so forth of FIGS. 1-19. Hardware layer 1804 also includes memory and storage modules 1810, which also have executable instructions 1808. Hardware layer 1804 may also comprise other hardware 1812, which represents any other hardware of the hardware layer 1804, such as the other hardware illustrated as part of machine 1900.

In the example architecture of FIG. 18, the software architecture 1802 may be conceptualized as a stack of layers where each layer provides particular functionality. For example, the software architecture 1802 may include layers such as an operating system 1814, libraries 1816, frameworks/middleware 1818, applications 1820 and presentation layer 1844. Operationally, the applications 1820 or other components within the layers may invoke application programming interface (API) calls 1825 through the software stack and receive a response, returned values, and so forth illustrated as messages 1826 in response to the API calls 1825. The layers illustrated are representative in nature and not all software architectures have all layers. For example, some mobile or special purpose operating systems may not provide the frameworks/middleware 1818, while others may provide such a layer. Other software architectures may include additional or different layers.

The operating system 1814 may manage hardware resources and provide common services. The operating system 1814 may include, for example, a kernel 1828, services 1830, and drivers 1832. The kernel 1828 may act as an abstraction layer between the hardware and the other software layers. For example, the kernel 1828 may be responsible for memory management, processor management (e.g., scheduling), component management, networking, security settings, and so on. The services 1830 may provide other common services for the other software layers. The drivers 1832 may be responsible for controlling or interfacing with the underlying hardware. For instance, the drivers 1832 may include display drivers, camera drivers, BLUETOOTH® drivers, flash memory drivers, serial communication drivers (e.g., Universal Serial Bus (USB) drivers), WI-FI® drivers, audio drivers, power management drivers, and so forth depending on the hardware configuration. In an example embodiment, the operating system 1814 includes sensors 1833 such as GPS data, optical sensors, gyroscopes, and accelerometers that can be paired with drone(s) 170 and vehicle(s) 162 to provide various data collection services.

The libraries 1816 may provide a common infrastructure that may be utilized by the applications 1820 or other components or layers. The libraries 1816 typically provide functionality that allows other software modules to perform tasks in an easier fashion than to interface directly with the underlying operating system 1814 functionality (e.g., kernel 1828, services 1830 or drivers 1832). The libraries 1816 may include system libraries 1834 (e.g., C standard library) that may provide functions such as memory allocation functions, string manipulation functions, mathematic functions, and the like. In addition, the libraries 1816 may include API libraries 1836 such as media libraries (e.g., libraries to support presentation and manipulation of various media format such as MPREG4, H.264, MP3, AAC, AMR, JPG, or PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1816 may also include a wide variety of other libraries 1838 to provide many other APIs to the applications 1820 and other software components/modules. In an example embodiment, the libraries 1816 include geolocation libraries 1839 that store location, landmark, address, street, and airspace data in order to facilitate package transport using public transportation vehicles and drones. Geolocation libraries 1839, in some examples, store geolocation data as raster maps and vector maps. In further embodiments, geolocation libraries 1839 store three-dimensional maps of locations in which drone delivery occurs.

The frameworks/middleware 1818 (also sometimes referred to as middleware) may provide a higher-level common infrastructure that may be utilized by the applications 1820 or other software components/modules. For example, the frameworks/middleware 1818 may provide various graphic user interface (GUI) functions, high-level resource management, high-level location services, and so forth. The frameworks/middleware 1818 may provide a broad spectrum of other APIs that may be utilized by the applications 1820 or other software components/modules, some of which may be specific to a particular operating system or platform. In an example embodiment, the frameworks/middleware 1818 include an image touch input framework 1822 and a communication framework 1823. The touch input framework 1822 can provide high-level support for touch input functions that can be used in aspects of the delivery system 150, such as receiving user input corresponding to a request for drone delivery. Similarly, the communication framework 1823 can provide high-level support for communication between client device(s) 110, drone(s) 170, vehicle(s) 162, terminal(s) 164 and the delivery system 150. Communication framework 1823 is implemented, in some embodiments, as a service-oriented architecture (i.e., "SOA") to allow for synchronization in a system which may involve a large number of vehicles 162, terminals, and drones 170. In various embodiments, the security framework 1824 provides high-level security protocols within the delivery system 150 for verification of client device(s) 110, drone(s) 170, and vehicle(s) 162. Moreover, the security framework 1824 provides data-access rules and encryption services for data collected from drone(s) 170, client device(s) 110, and vehicle(s) 162. For example, in some embodiments, the security framework 1824 verifies a user's biometric identifiers through client device 110 and provides encryption for the biometric data collected.

The applications 1820 include built-in applications 1840 or third party applications 1842. Examples of representative built-in applications 1840 may include, but are not limited to, a contacts application, a browser application, a book reader application, a location application, a media application, a messaging application, or a game application. Third party applications 1842 may include any of the built-in applications 1840 as well as a broad assortment of other applications. In a specific example, the third party application 1842 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third party application 1842 may invoke the API calls 1825 provided by the mobile operating system such as operating system 1814 to facilitate functionality described herein. In another example embodiment, the applications 1820 include a stand-alone application 1845 to access information about the delivery system 150 including current drone location and drone delivery route.

The applications 1820 may utilize built-in operating system functions (e.g., kernel 1828, services 1830 or drivers 1832), libraries (e.g., system libraries 1834, API libraries 1836, and other libraries 1838), frameworks/middleware 1818 to create user interfaces to interact with users of the system. Alternatively, or additionally, in some systems, interactions with a user may occur through a presentation layer, such as presentation layer 1844. In these systems, the application/module "logic" can be separated from the aspects of the application/module that interact with a user.

Some software architectures utilize virtual machines. In the example of FIG. 18, this is illustrated by virtual machine 1848. A virtual machine creates a software environment where applications/modules can execute as if they were executing on a hardware machine (such as the machine 1900 of FIG. 19, for example). The virtual machine 1848 is hosted by a host operating system (operating system 1814 in FIG. 18) and typically, although not always, has a virtual machine monitor 1846, which manages the operation of the virtual machine 1848 as well as the interface with the host operating system (i.e., operating system 1814). A software architecture executes within the virtual machine 1848 such as an operating system 1850, libraries 1852, frameworks/middleware 1854, applications 1856 or presentation layer 1858. These layers of software architecture executing within the virtual machine 1848 can be the same as corresponding layers previously described or may be different.

Figure 19:
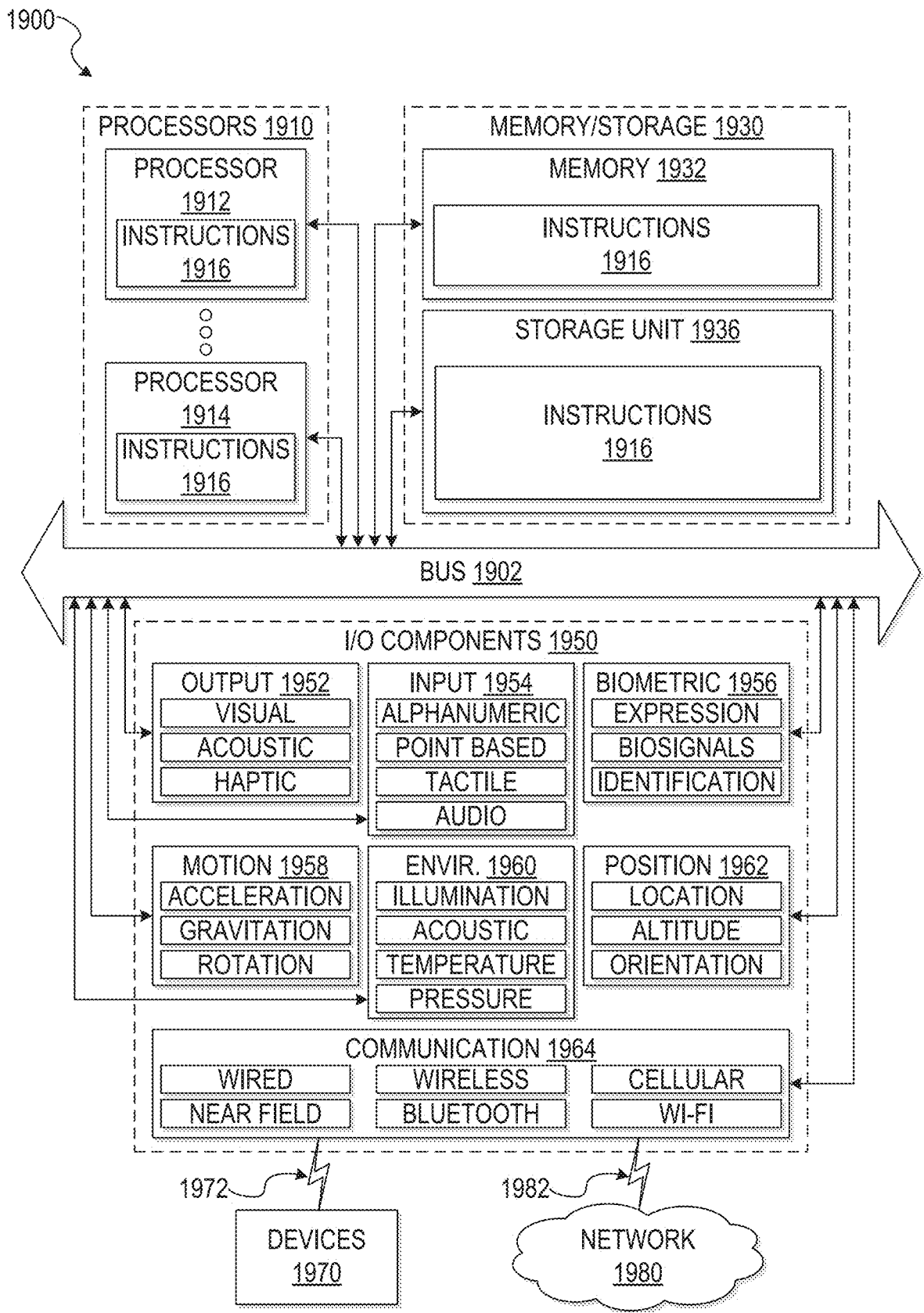
FIG. 19 illustrates a diagrammatic representation of a machine in the form of a computer system within which a set of instructions may be executed for causing the machine to perform any one or more of the methodologies discussed herein, according to an example embodiment.

FIG. 19 is a block diagram illustrating components of a machine 1900, according to some example embodiments, able to read instructions from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform any one or more of the methodologies discussed herein can be executed. For example, the instructions 1916 can cause the machine 1900 to execute the flow diagrams of FIGS. 4, 5, 7, 8, and 10. Additionally, or alternatively, the instruction 1916 can implement the eligibility module 210, the data module 220, the geolocation module 230, the user interface module 240, the communication module 250, the notification module 260, and the delivery route module 270 of FIG. 2, and so forth. The instructions 1916 transform the general, non-programmed machine into a particular machine programmed to carry out the described and illustrated functions in the manner described. In alternative embodiments, the machine 1900 operates as a standalone device or can be coupled (e.g., networked) to other machines. In a networked deployment, the machine 1900 may operate in the capacity of a server machine or a client machine in a server-client network environment, or as a peer machine in a peer-to-peer (or distributed) network environment.

The machine 1900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1916, sequentially or otherwise, that specify actions to be taken by the machine 1900. Further, while only a single machine 1900 is illustrated, the term "machine" shall also be taken to include a collection of machines 1900 that individually or jointly execute the instructions 1916 to perform any one or more of the methodologies discussed herein.

The machine 1900 can include processors 1910, memory/storage 1930, and I/O components 1950, which can be configured to communicate with each other such as via a bus 1902. In an example embodiment, the processors 1910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1912 and processor 1914 that may execute instructions 1916. The term "processor" is intended to include multi-core processor that may comprise two or more independent processors (sometimes referred to as "cores") that can execute instructions contemporaneously. Although FIG. 19 shows multiple processors 1910, the machine 1900 may include a single processor with a single core, a single processor with multiple cores (e.g., a multi-core processor), multiple processors with a single core, multiple processors with multiples cores, or any combination thereof.

The memory/storage 1930 can include a memory 1932, such as a main memory, or other memory storage, and a storage unit 1936, both accessible to the processors 1910 such as via the bus 1902. The storage unit 1936 and memory 1932 store the instructions 1916 embodying any one or more of the methodologies or functions described herein. The instructions 1916 can also reside, completely or partially, within the memory 1932, within the storage unit 1936, within at least one of the processors 1910 (e.g., within the processor's cache memory), or any suitable combination thereof, during execution thereof by the machine 1900. Accordingly, the memory 1932, the storage unit 1936, and the memory of the processors 1910 are examples of machine-readable media.

As used herein, the term "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1916. The term "machine-readable medium" shall also be taken to include any medium, or combination of multiple media, that is capable of storing instructions (e.g., instructions 1916) for execution by a machine (e.g., machine 1900), such that the instructions, when executed by one or more processors of the machine 1900 (e.g., processors 1910), cause the machine 1900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1950 can include a wide variety of components to receive input, provide output, produce output, transmit information, exchange information, capture measurements, and so on. The specific I/O components 1950 that are included in a particular machine will depend on the type of machine. For example, portable machines such as mobile phones will likely include a touch input device or other such input mechanisms, while a headless server machine will likely not include such a touch input device. It will be appreciated that the I/O components 1950 can include many other components that are not shown in FIG. 19. The I/O components 1950 are grouped according to functionality merely for simplifying the following discussion, and the grouping is in no way limiting. In various example embodiments, the I/O components 1950 can include output components 1952 and input components 1954. The output components 1952 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1954 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1950 can include biometric components 1956, motion components 1958, environmental components 1960, or position components 1962 among a wide array of other components. For example, the biometric components 1956 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1958 can include acceleration sensor components (e.g., an accelerometer), gravitation sensor components, rotation sensor components (e.g., a gyroscope), and so forth. The environmental components 1960 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1962 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1950 may include communication components 1964 operable to couple the machine 1900 to a network 1980 or devices 1970 via a coupling 1982 and a coupling 1972, respectively. For example, the communication components 1964 include a network interface component or other suitable device to interface with the network 1980. In further examples, communication components 1964 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1970 may be another machine or any of a wide variety of peripheral devices (e.g., a peripheral device coupled via a Universal Serial Bus (USB)).

Moreover, the communication components 1964 can detect identifiers or include components operable to detect identifiers. For example, the communication components 1964 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1980 or a portion of the network 1980 may include a wireless or cellular network, and the coupling 1982 may be a Code Division Multiple Access (CDMA) connection, a Global System for Mobile communications (GSM) connection, or other type of cellular or wireless coupling. In this example, the coupling 1982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1916 can be transmitted or received over the network 1980 using a transmission medium via a network interface device (e.g., a network interface component included in the communication components 1964) and utilizing any one of a number of well-known transfer protocols (e.g., Hypertext Transfer Protocol (HTTP)). Similarly, the instructions 1916 can be transmitted or received using a transmission medium via the coupling 1972 (e.g., a peer-to-peer coupling) to devices 1970. The term "transmission medium" shall be taken to include any intangible medium that is capable of storing, encoding, or carrying the instructions 1916 for execution by the machine 1900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of delivering a package using a drone and one or more computer systems, the method comprising:
   receiving a request to deliver the package to a drop-off destination using the drone;
   determining, using the one or more computer systems, a drone delivery route from a first vehicle to the drop-off destination, the first vehicle transporting the drone;
   communicating to the drone, from the one or more computer systems via a wired or wireless connection, the drone delivery route;
   carrying, by the drone in accordance with the drone delivery route communicated to the drone, the package from the first vehicle to the drop-off destination, where the drop-off destination is identified by the drone based on sensor data of the drone during the carrying;
   releasing, by the drone, the package upon delivery of the package by the drone at the drop-off destination; and
   communicating to the drone, from the one or more computer systems via the wired or wireless connection, an instruction for the drone to return to a second vehicle responsive to receiving an indication at the one or more computer systems that the drone has delivered the package.

2. The method of claim 1, wherein the first vehicle is selected based at least in part upon timing or scheduling information for vehicles that travel to geographic locations of terminals.

3. The method of claim 2, wherein the vehicles that travel to the geographic locations of the terminals comprise public infrastructure vehicles.

4. The method of claim 1, further comprising:
   determining, using the one or more computer systems, a return route for the drone from the drop-off destination to the second vehicle; and
   communicating to the drone, from the one or more computer systems via the wired or wireless connection, the return route, where the return route is different than the drone delivery route.

5. The method of claim 1, further comprising:
- determining, using the one or more computer systems, a different route from the drop-off destination to a different drop-off destination for delivery of a different package by the drone; and
- communicating to the drone, from the one or more computer systems via the wired or wireless connection, the different route and an instruction for the drone to deliver the different package to the different drop-off destination along the different route before returning to the second vehicle.

6. The method of claim 1, wherein the request includes location information of the drop-off destination.

7. The method of claim 1, further comprising:
- determining, using the one or more computer systems, a route to a waiting terminal from another vehicle and a route to the first vehicle from the waiting terminal; and
- communicating to the drone, from the one or more computer systems via the wired or wireless connection:
- the route to the waiting terminal and the route to the first vehicle;
- an instruction for the drone to travel the route to the waiting terminal while carrying the package; and
- an instruction for the drone to travel the route to the first vehicle while carrying the package.

8. The method of claim 1, wherein the drone identifies the drop-off destination for releasing the package upon delivery via optical recognition of the drop-off destination by the drone using sensor data collected by the drone from an optical sensor of the drone.

9. The method of claim 1, wherein the drop-off destination is a geolocation of a user device specified by the request.

10. The method of claim 1, further comprising:
- executing, via the drone, the instruction for the drone to return to the second vehicle after identifying, via the drone, the drop-off destination based on the sensor data and after delivering the package.

11. A system comprising:
- a drone;
- a communication module, implemented in hardware, configured to receive a request to deliver a package to a drop-off destination using the drone;
- a geolocation module, implemented in hardware, configured to select a first vehicle that transports the drone; and
- a delivery route module, implemented at least partially in hardware, configured to determine a drone delivery route from the first vehicle to the drop-off destination;
- the communication module further configured to communicate to the drone, via a wired or wireless connection, the drone delivery route from the first vehicle to the drop-off destination as determined via the delivery route module;
- the drone configured to carry the package, in accordance with the drone delivery route communicated to the drone and based on identification of the drop-off destination by the drone via drone sensor data during the carrying, from the first vehicle to the drop-off destination, release the package upon delivery of the package at the drop-off destination, and return to a second vehicle after delivering the package.

12. The system of claim 11, wherein the geolocation module is configured to select the first vehicle based at least in part upon timing or scheduling information for vehicles that travel to geographic locations of terminals.

13. The system of claim 12, wherein the vehicles that travel to the geographic locations of the terminals comprise public infrastructure vehicles.

14. The system of claim 11, wherein the delivery route module is further configured to determine a return route for the drone from the drop-off destination to the second vehicle, and the communication module is further configured to communicate to the drone, via the wired or wireless connection, the return route, where the return route is different than the drone delivery route.

15. The system of claim 11, wherein the delivery route module is further configured to determine a different route from the drop-off destination to a different drop-off destination for delivery of a different package by the drone, and the communication module is further configured to communicate to the drone, via the wired or wireless connection, the different route and an instruction for the drone to carry the different package to the different drop-off destination along the different route and release the package upon delivery of the package by the drone at the different drop-off destination before returning to the second vehicle.

16. The system of claim 11, wherein the request includes location information of the drop-off destination.

17. The system of claim 11, wherein the delivery route module is further configured to determine a route to a waiting terminal from another vehicle and a route to the first vehicle from the waiting terminal; and
- the communication module is further configured to communicate to the drone, via the wired or wireless connection:
- the route to the waiting terminal and the route to the first vehicle;
- an instruction for the drone to travel the route to the waiting terminal while carrying the package; and
- an instruction for the drone to travel the route to the first vehicle while carrying the package.

18. The system of claim 11, wherein the drone is configured to identify the drop-off destination for releasing the package upon delivery via optical recognition of the drop-off destination by the drone using the drone sensor data, the drone sensor data generated via at least an optical sensor of the drone.

19. The system of claim 11, wherein the drop-off destination is a geolocation of a user device specified by the request.

20. A delivery system, comprising:
- a drone; and
- a machine-readable medium storing instructions that, when executed by at least one processor of a machine, causes the machine and the drone to perform operations including:
  - i) receiving, by the machine, a request to deliver a package to a drop-off destination using the drone;
  - ii) determining, by the machine, a drone delivery route from a vehicle to the drop-off destination, the vehicle transporting the drone;
  - iii) communicating, from the machine to the drone via a wired or wireless connection, the drone delivery route from the vehicle to the drop-off destination as determined by the machine;
  - iv) carrying, by the drone in accordance with the drone delivery route communicated from the machine to the drone and based on identification of the drop-off destination by the drone via drone sensor data, the package from the vehicle to the drop-off destination;

v) releasing, by the drone, the package upon delivery of the package by the drone at the drop-off destination; and v) communicating, from the machine to the drone via the wired or wireless connection, an instruction for the drone to return to another vehicle responsive to receiving an indication at the machine that the drone has delivered the package.

\* \* \* \* \*